(12) United States Patent
Nagatani et al.

(10) Patent No.: US 10,642,136 B2
(45) Date of Patent: May 5, 2020

(54) HEAT EXCHANGING APPARATUS, COOLING APPARATUS, AND PROJECTOR

(71) Applicant: SEIKO EPSON CORPORATION, Tokyo (JP)

(72) Inventors: Kaname Nagatani, Matsumoto (JP); Kentaro Nakamura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/127,580

(22) Filed: Sep. 11, 2018

(65) Prior Publication Data

US 2019/0079375 A1 Mar. 14, 2019

(30) Foreign Application Priority Data

Sep. 12, 2017 (JP) ................................ 2017-175130

(51) Int. Cl.
*G03B 21/16* (2006.01)
*F28F 9/22* (2006.01)
(Continued)

(52) U.S. Cl.
CPC ........... *G03B 21/16* (2013.01); *F28D 1/0333* (2013.01); *F28D 1/05358* (2013.01);
(Continued)

(58) Field of Classification Search
CPC .. G03B 21/16; G03B 21/2073; G03B 21/208; F28D 1/0333; F28D 1/05358;
(Continued)

(56) References Cited

U.S. PATENT DOCUMENTS

| 2002/0134538 A1* | 9/2002 | Moreau ................... F28D 1/035 165/173 |
| 2009/0223656 A1 | 9/2009 | Hiyama et al. |
| 2012/0132413 A1* | 5/2012 | Cheadle ................... F01M 5/00 165/297 |
| 2013/0206371 A1* | 8/2013 | Fujita .................... H01L 23/473 165/104.28 |

(Continued)

FOREIGN PATENT DOCUMENTS

| DE | 102004033099 A1 * | 1/2005 | ......... F28D 1/05391 |
| FR | 3024537 A1 * | 2/2016 | ............ F28F 9/0212 |

(Continued)

*Primary Examiner* — Cara E Rakowski
*Assistant Examiner* — Magda Cruz
(74) *Attorney, Agent, or Firm* — Oliff PLC

(57) ABSTRACT

A heat exchanging apparatus includes one inflow channel having an inflow port via which a liquid refrigerant flows in, one outflow channel having an outflow port via which the liquid refrigerant flowing through the outflow channel flows out, and a plurality of channels arranged in a flow direction of the liquid refrigerant flowing through the inflow channel, the plurality of channels connecting the inflow channel the outflow channel and causing the liquid refrigerant flowing from the inflow channel to flow into the outflow channel. The plurality channels are connected to the inflow channel over a portion from the inflow port to a terminal end of the inflow channel. The inflow channel includes a buffer section disposed between the inflow port and the terminal end, the buffer section configured no reduce a flow rate of the liquid refrigerant flowing through the inflow channel.

21 Claims, 8 Drawing Sheets

(51) Int. Cl.
*F28F 9/02* (2006.01)
*G03B 21/20* (2006.01)
*F28D 1/03* (2006.01)
*F28D 1/053* (2006.01)
*F28D 15/00* (2006.01)
*F28D 21/00* (2006.01)

(52) U.S. Cl.
CPC .............. *F28F 9/027* (2013.01); *F28F 9/028* (2013.01); *F28F 9/22* (2013.01); *G03B 21/208* (2013.01); *G03B 21/2073* (2013.01); *F28D 1/0341* (2013.01); *F28D 15/00* (2013.01); *F28D 2021/0028* (2013.01); *F28F 2009/222* (2013.01); *G03B 21/204* (2013.01)

(58) Field of Classification Search
CPC ................... F28D 1/0341; F28D 15/00; F28D 2021/0028; F28D 1/02; F28D 1/04; F28F 9/027; F28F 9/028; F28F 9/22; F28F 2009/222; F24B 1/886
See application file for complete search history.

(56) References Cited

U.S. PATENT DOCUMENTS

2016/0301902 A1* 10/2016 Nakamura ........... H04N 9/3144

FOREIGN PATENT DOCUMENTS

| JP | 2005-030741 A | 2/2005 |
| JP | 2006-132819 A | 5/2006 |
| JP | 2006-234255 A | 9/2006 |
| JP | 2006-337005 A | 12/2006 |
| JP | 2016-035378 A | 3/2016 |

* cited by examiner

HEAT EXCHANGING APPARATUS, COOLING APPARATUS, AND PROJECTOR

BACKGROUND

1. Technical Field

The present invention relates to a heat exchanging apparatus, a cooling apparatus, and a projector.

2. Related Art

There is a known radiator (see JP-A-2006-234255, for example) and a heat exchanger (see JP-A-2006-132819, for example) through which a liquid refrigerant flows.

The radiator described in JP-A-2006-234255 includes a pair of upper and lower headers so provided as to face each other, a plurality of pipes that connect the pair of headers to each other, and a heat dissipating member to which corrugate fins provided between the plurality of pipes are attached. A liquid refrigerant that flows into the lower header flows through the plurality of pipes into the upper header. Cooled air from an electric fan is delivered to the pipes and fins, whereby the liquid refrigerant flowing through the pipes is cooled.

The heat exchanger described in JP-A-2006-132819 forms a liquid cooling cycle provided in a projector and includes a pair of headers and a large number of micro-bare tubes attached to and between the pair of headers. In the heat exchanger, a liquid refrigerant flowing into one of the headers passes and moves through the large number of micro-bare tubes into the other header and is discharged out of the other header. Heat of the liquid refrigerant is dissipated to the outside via minute wall surfaces of the micro-bare tubes when the liquid refrigerant passes through the micro-bare tubes. The liquid refrigerant is thus cooled.

Since the radiator described in JP-A-2006-234255 and the heat exchange described in JP-A-2006-132819 each include the headers and therefore tend to be a large apparatus. To address the size problem, a heat exchanging apparatus with no header is proposed.

However, for example, in a configuration including an inflow channel into which a liquid refrigerant flows, an outflow channel out of which the liquid refrigerant flows, and a plurality of channels that connect the inflow channel and the outflow channel to each other, the following phenomenon called drift tends to occur: Out of the plurality of channels, the liquid refrigerant readily flows through a certain channel, but the liquid refrigerant is not readily flow through another channel.

Specifically, since the liquid refrigerant having flowed into the inflow channel accumulates at the terminal end of the inflow channel, the flow rate of the liquid refrigerant is high in an upstream portion (base end) of the inflow channel but low in a downstream portion (terminal end) of the inflow channel. Therefore, out of the plurality of channels, the liquid refrigerant having flowed into the inflow channel readily flows through the channels connected to the downstream portion but does not readily flow through the channels connected to the upstream portion. If the drift of the liquid refrigerant occurs as described above, the liquid refrigerant is not uniformly cooled in the heat exchanging apparatus, and the liquid refrigerant could therefore not be sufficiently cooled.

There is therefore a demand for a configuration that allows the liquid refrigerant to flow efficiently to increase the efficiency at which the liquid refrigerant is cooled.

SUMMARY

An advantage of some aspects of the invention is to provide a heat exchanging apparatus, a cooling apparatus, and a projector capable of efficiently cooling a liquid refrigerant.

A heat exchanging apparatus according to a first aspect of the invention includes one inflow channel having an inflow port via which a liquid refrigerant flows in, the one inflow channel through which the liquid refrigerant flows in a first direction, one outflow channel through which the liquid refrigerant having flowed into the inflow channel flows, the one outflow channel having an outflow port via which the liquid refrigerant flowing through the outflow channel flows out, and a plurality of channels extending in a second direction intersecting the first direction, the plurality of channels arranged in the first direction and connecting the inflow channel to the outflow channel, the plurality of channels causing the liquid refrigerant flowing from the inflow channel to flow into the outflow channel. The plurality of channels are connected to the inflow channel over a portion from the inflow port to a terminal end of the inflow channel, and the inflow channel includes a buffer section disposed between the inflow port and the terminal end, the buffer section configured to reduce a flow rate of the liquid refrigerant flowing through the inflow channel.

According to the configuration described above, the liquid refrigerant having flowed into the inflow channel via the inflow port flows through the plurality of channels arranged in the first direction, which is the flow direction of the liquid refrigerant flowing through the inflow channel, flows into the outflow channel, and exits out of the heat exchanging apparatus via the outflow port. In this process, since the buffer section is located in the inflow channel in the portion from the inflow port to the terminal end, the channel resistance in the flow direction increases and the flow rate of the liquid refrigerant therefore decreases in a portion in the vicinity of the buffer section. The liquid refrigerant can therefore readily flow not only into the channels connected to a portion in the vicinity of the terminal end of the inflow channel but the channels connected to the portion in the vicinity of the buffer section. The liquid refrigerant can therefore readily flow into each of the channels, whereby the efficiency at which the liquid refrigerant is cooled can be improved.

Further, since the heat exchanging apparatus is not required to include a pair of headers, such as those shown in JP-A-2006-234255 and JP-A-2006-132819 described above, the size of heat exchanging apparatus can be reduced.

In the first aspect described above, it is preferable that a cross-sectional area, along a third direction perpendicular to the first direction, of the inflow channel in a portion where the buffer section is located is smaller than a cross-sectional area, along the third direction, of the inflow channel in a portion where the buffer section is not provided.

According to the configuration described above, the channel resistance in the first direction in the portion in the vicinity of the buffer section can be reliably increased. The liquid refrigerant is therefore reliably allowed to flow into the channels connected to the portion in the vicinity of the buffer section.

In the first aspect described above, it is preferable that the buffer section is a diameter reducer protruding from an inner wall of the inflow channel inward in a radial direction to reduce a diameter of the inflow channel.

According to the configuration described above, a buffer section that achieves the function described above can be readily formed. A heat exchanging apparatus that provides the effects described above can therefore be configured without employing a complicated configuration.

In the first aspect described above, it is preferable that the inflow channel includes a plurality of the diameter reducer along the first direction.

According to the configuration described above, a plurality of portions where the channel resistance in the first direction increases can be provided in the inflow channel. The liquid refrigerant is therefore allowed to readily flow through each of the plurality of channels described above. The efficiency at which the heat exchanging apparatus cools the liquid refrigerant can therefore be further improved.

In the first aspect described above, it is preferable that the buffer section is a shaft provided in the inflow channel and extending in the first direction, and that the shaft has a first portion having an outer diameter that is a first length and a second portion located on a downstream side of the first portion in the first direction, the second portion having an outer diameter that is a second length greater than the first length.

According to the configuration described above, the channel resistance can be increased in the first portion and can be further increased in the second portion. Therefore, when the liquid refrigerant flows via the first and second portions, the flow rate of the liquid refrigerant can be gradually reduced. The liquid refrigerant can therefore readily flow into, out of the plurality of channels described above, each of the channels connected to the range from the inflow port to the first portion, each of the channels connected to the range from the first portion to the second portion, and each of the channels connected to the range from the second portion to the terminal end. The efficiency at which the heat exchanging apparatus cools the liquid refrigerant can be therefore further improved.

In the first aspect described above, it is preferable that the outer diameter of the shaft increases in the first direction.

According to the configuration described above, the cross-sectional area that allows the liquid refrigerant to flow therethrough in the inflow channel can be reduced as the liquid refrigerant travels in the first direction by the buffer section. Therefore, the flow rate of the liquid refrigerant can be reduced and the channel resistance can be increased as the liquid refrigerant travels in the first direction. The liquid refrigerant is therefore readily allowed to flow through each of the plurality of channels, whereby the efficiency at which the liquid refrigerant is cooled can be further improved.

A heat exchanging apparatus according to a second aspect of the invention includes one inflow having has an inflow port via which a liquid refrigerant flows in, the one inflow channel through which the liquid refrigerant flows in a first direction, a first primary channel disposed along the first direction, the first primary channel through which the liquid refrigerant having flowed into the inflow channel flows, a second primary channel disposed along the first direction, the second primary channel through which the liquid refrigerant having flowed into the first primary channel flows, one outflow channel through which the liquid refrigerant having flowed into the second primary channel flows, the one outflow channel having an outflow port via which the liquid refrigerant flowing through the outflow channel flows out, a plurality of first channels extending in a second direction intersecting the first direction, the plurality of the first channels arranged in the first direction and connecting the inflow channel to the first primary channel, the plurality of the first channels causing the liquid refrigerant flowing from the inflow channel to flow into the first primary channel, a plurality of second channels extending in the second direction, the plurality of the second channels arranged in the first direction and connecting the first primary channel to the second primary channel, the plurality of the second channels causing the liquid refrigerant flowing from the first primary channel to flow into the second primary channel, and a plurality of third channels extending in the second direction, the plurality of the third channels arranged in the first direction and connecting the second primary channel to the outflow channel, the plurality of the third channels causing the liquid refrigerant flowing from the second primary channel to flow into the outflow channel.

According to the configuration described above, the length of the inflow channel (dimension along first direction) can be set at a relatively small value. The flow rate of the liquid refrigerant in a portion in the vicinity of the terminal end of the inflow channel therefore decreases, whereby the liquid refrigerant can readily flow through each of the plurality of first cannels described above.

The liquid refrigerant having flowed through the plurality of first cannels then flows through the first primary channel. Since the length of the first primary channel can also be set at a relatively small value, the liquid refrigerant having flowed through the first primary channel can readily flow through each of the plurality of second cannels. Similarly, since the length of the second primary channel can also be set at a relatively small value, the liquid refrigerant having flowed through the second primary channel can readily flow through each of the plurality of third cannels. As described above, the liquid refrigerant having flowed into the inflow channel can readily flow through each of the plurality of first cannels, the plurality of second cannels, and the plurality of third cannels. The efficiency at which the liquid refrigerant is cooled can therefore be improved.

Further, since the heat exchanging apparatus is not required to include a pair of headers, such as those described above, the size of heat exchanging apparatus can be reduced, as in the case of the heat exchanging apparatus according to the first aspect described above.

In the second aspect described above, it is preferable that the inflow channel and the second primary channel are integrated with each other, and that a center axis of the inflow channel and a center axis of the second primary channel are parallel to each other, and that the outflow channel and the first primary channel are integrated with each other, and that a center axis of the outflow channel and a center axis of the first primary channel are parallel to each other.

It is noted that the situation in which the center axes of the inflow/outflow channels and the first/second primary channels are parallel to each other includes not only the case where the center axes thereof are completely parallel to each other but a case where the center axes thereof can be recognized as to be parallel to each other, that is, a case where the center axes thereof are roughly parallel to each other.

The configuration described above causes the liquid refrigerant that flows through the heat exchanging apparatus to flow along a roughly S-letter-shaped channel. The heat exchanging apparatus can therefore be compact as compared with a heat exchanging apparatus so configured that the liquid refrigerant flows through the plurality of first channels, the plurality of second channels, and the plurality of third channels in the same direction.

In the first and second aspects described above, it is preferable that the inflow channel, and the outflow channel are disposed to be parallel to each other.

It is noted that the situation in which the inflow channel and the outflow channel are parallel to each other includes not only the case where the center axes thereof are completely parallel to each other but a case where the center axes thereof can be recognized as to be parallel to each other, that is, a case where the center axes thereof are roughly parallel to each other.

According to the configuration described above, the size of the heat exchanging apparatus can be reduced as compared with a case where the inflow channel and the outflow channel are not to be parallel to each other.

A cooling apparatus according to a third aspect of the invention includes the heat exchanging apparatus described above, a tank configured to store the liquid refrigerant, a heat exchanger configured to transfer heat of a cooling target to the liquid refrigerant to cool the cooling target, and a pump configured to cause the liquid refrigerant to which the heat of the cooling target has been transferred to flow into the heat exchanging apparatus.

The third aspect described above can provide the same effects as those provided by the heat exchanging apparatus according to the first or second aspect described above. Further, in the thus configured cooling apparatus, the heat exchanging apparatus described above cools the liquid refrigerant to which the heat of the cooling target is transferred, whereby the cooling target can be effectively cooled.

A projector according to a fourth aspect of the invention includes a light source apparatus configured to emit light, a light modulator configured to modulate the light emitted from the light source apparatus in accordance with image information, a projection optical apparatus configured to project the light modulated by the light modulator, and the cooling apparatus described above.

The fourth aspect described above can provide the same effects as those provided by the cooling apparatus according to the third aspect described above.

In the fourth aspect described above, it is preferable that the cooling tar et is the light modulator.

In the fourth aspect described above, it is preferable that the projector further includes a polarization conversion element configured to align polarization directions of light incident thereon with one another, and that the cooling target is the polarization conversion element.

In the fourth aspect described above, it is preferable that the projector further includes a wavelength converter configured to convert a wavelength of light incident thereon, and that the cooling target is the wavelength converter.

In the fourth aspect described above, it is preferable that the projector further includes a light diffuser configured to diffuse light incident thereon, and that the cooling target is the light diffuser.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
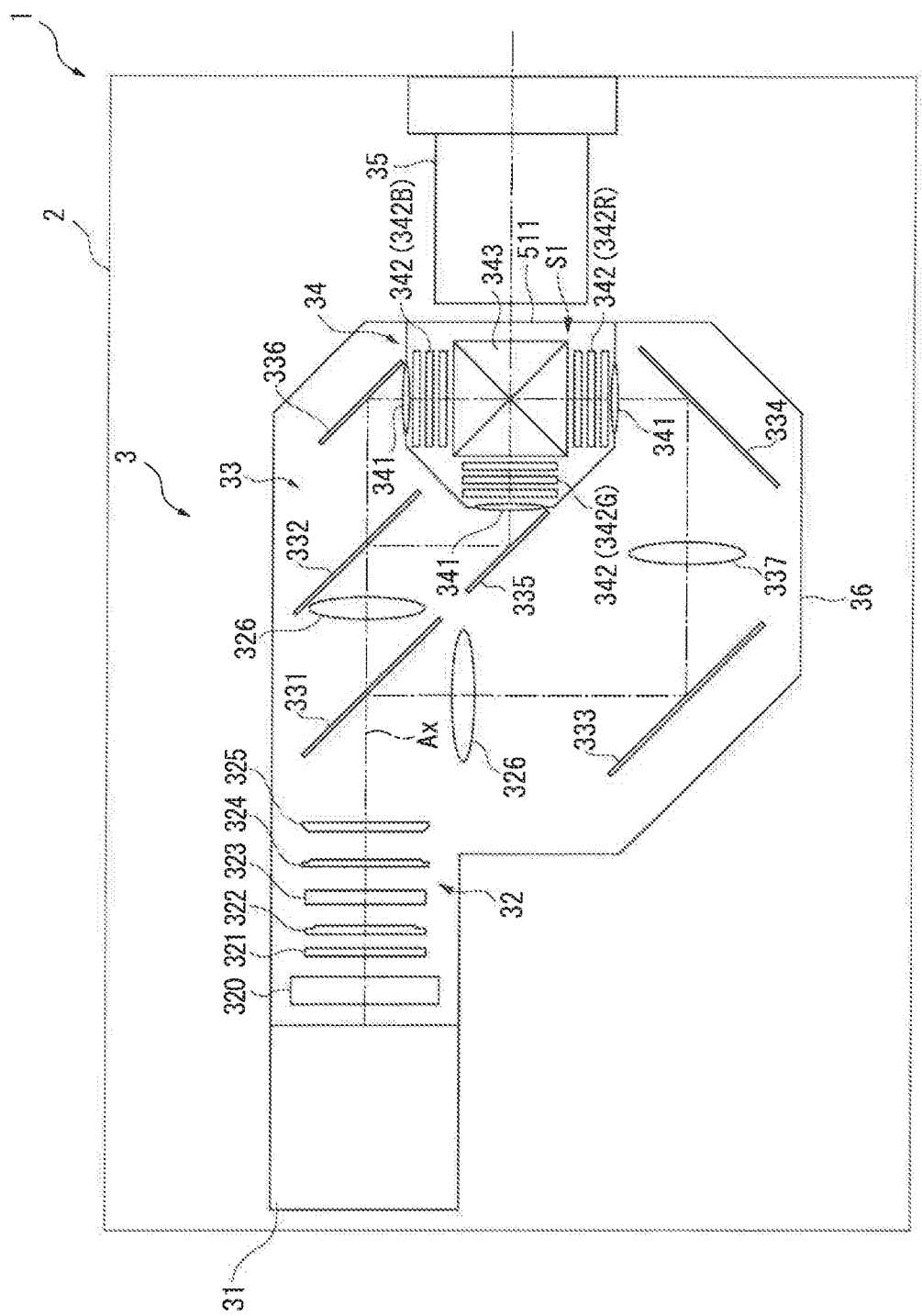
FIG. 1 is a diagrammatic view showing the configuration of a projector according to a first embodiment of the invention.

A first embodiment of the invention will be described below with reference to the drawings
Exterior Configuration of Projector FIG. 1 is a diagrammatic view showing the configuration of a projector 1 according to the present embodiment.

The projector 1 according to the present embodiment is a projection-type display apparatus that modulates light outputted from a light source apparatus 31, which will be described later, to form and project an image according to image information. The projector 1 includes a roughly rectangular parallelepiped exterior enclosure 2 and an image projection apparatus 3 disposed in the exterior enclosure 2, as shown in FIG. 1.

The thus configured projector 1 is partly characterized by the configuration of a heat exchanging apparatus that transfers heat of a liquid refrigerant having cooled a cooling target to another refrigerant to cool the liquid refrigerant. The heat exchanging apparatus will be described later in detail.

Figure 2:
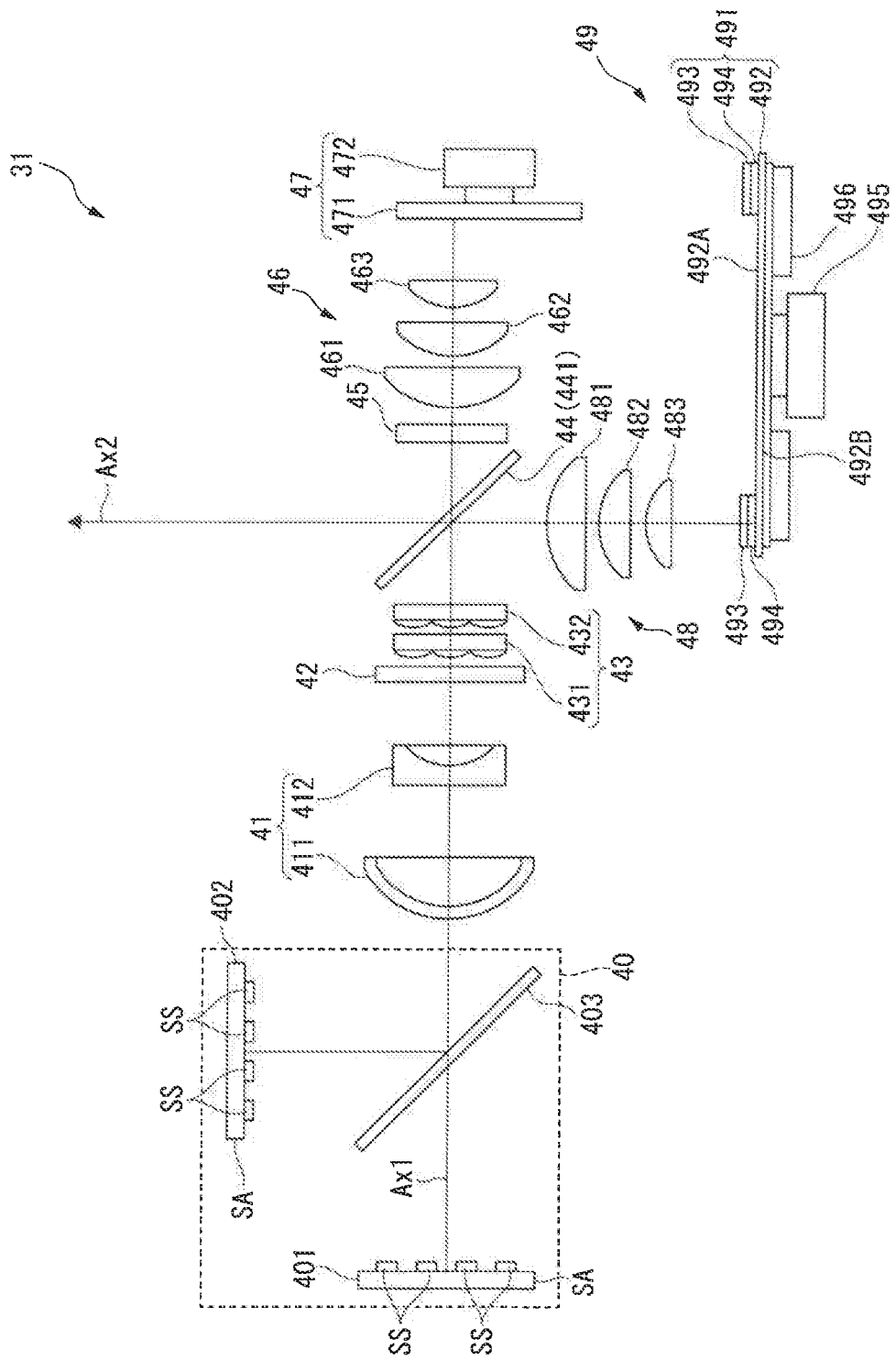
FIG. 2 is a diagrammatic view showing the configuration of a light source apparatus in the first embodiment.

The configuration of the projector 1 will be described below in detail.
Configuration of Image Projection Apparatus The image projection apparatus 3 forms and projects an image according to image information inputted from a controller (not shown) disposed in the exterior enclosure 2. The image projection apparatus 3 includes a light source apparatus 31, a homogenizing apparatus 32, a color separation apparatus 33, an electrooptical apparatus 34, a projection optical apparatus 35, and an optical part enclosure 36.
Configuration of Light Source Apparatus FIG. 2 is a diagrammatic view showing the configuration of the light source apparatus 31.

The light source apparatus 31 outputs a light flux containing red light, green light, and blue light to the homogenizing apparatus 32. The light source apparatus 31 includes a light source section 40, an afocal optical element 41, a first retardation element 42, a homogenizer optical apparatus 43, a light combiner 44, a second retardation element 45, a first light collection element 46, a light diffuser 47, a second light collection element 48, and a wavelength converter 49, as shown in FIG. 2.

Out of the components described above, the light source section 40, the afocal optical element 41, the first retardation element 42, the homogenizer optical apparatus 43, the second retardation element 45, the first light collection element 46, and the light diffuser 47 are arranged along a first illumination optical axis Ax1. On the other hand, the second light collection element 48 and the wavelength converter 49 as well as the homogenizing apparatus 32, which will be described later, are arranged along a second illumination optical axis Ax2, which intersects the first illumination optical axis Ax1. The light combiner 44 is disposed at the intersection of the first illumination optical axis Ax1 and the second illumination optical axis Ax2.

Configuration of Light Source Section

The light source section 40 outputs light source light that is blue light. The light source section 40 includes a first light source section 401, a second light source section 402, and a light combining member 403.

The first light source section 401 and the second light source section 402 each include a solid-state light source array SA, in which a plurality of solid-state light sources SS, which are each a laser diode (LD), are arranged in a matrix, and parallelizing elements (not shown) that parallelize the blue light outputted from the solid-state light source array SA and reduces the diameter of the blue light. The solid-state light sources SS emit excitation light having intensity that peaks, for example, at a wavelength of 440 nm but may instead emit excitation light having intensity that peaks at a wavelength of 446 nm or 460 nm. Still instead, the solid-state light sources in each of the light source sections 401 and 402 may be the combination of solid-state light sources that emit excitation light beams having intensities that peak at different wavelengths. The excitation light emitted from each of the solid-state light sources SS is parallelized by the corresponding parallelizing element and incident on the light combining member 403.

In the present embodiment, the excitation light emitted from each of the solid-state light sources SS is s-polarized light but may instead be p-polarized light. The light source sections 401 and 402 may include solid-state light sources SS that emit s-polarized excitation light and solid-state light sources SS that emit p-polarized excitation light, respectively. In this case, the first retardation element 42 can be omitted.

The light combining member 403 combines the light source light outputted from the first light source section 401 and the light source light outputted from the second light source section 402 with each other and causes the combined light source light to exit.

The light source section 40 may include only the first light source section 401 or may include a larger number of light source sections. In the case where the light source section 40 includes only the light source section 401, the light combining member 403 can be omitted.

Configurations of Afocal Optical Element and First Retardation Element

The afocal optical element 41 includes lenses 411 and 412, reduces the diameter of the light source light incident from the light source section 40, then parallelizes the light source light, and causes the light source light to exit.

The first retardation element 42 is a half wave plate. The s-polarized light source light incident via the afocal optical element 41 passes through the first retardation element 42, which converts part of the s-polarized light source light into p-polarized light source light. Light source light formed of the s-polarized light and the p-polarized light is thus produced.

Configuration of Homogenizer Optical Apparatus

The homogenizer optical apparatus 43 includes two multi-lenses 431 and 432 and homogenizes the illuminance distribution of the light source light to be incident on an illuminated region of each of the light diffuser 47 and the wavelength converter 49. The homogenizer optical apparatus 43 is not necessarily disposed on the light exiting side of the first retardation element 42 and may instead be disposed between the afocal optical element 41 and the first retardation element 42.

Configuration of Light Combiner

The light combiner 44 includes a polarization separation layer 441, which inclines by about 45° with respect to the first illumination optical axis Ax1 and the second illumination optical axis Ax2.

The polarization separation layer 441 is characterized not only in that it separates the s-polarized light and p-polarized light contained in the light source light incident via the homogenizer optical apparatus 43 from each other but in that it transmits fluorescence produced by the wavelength converter 49 irrespective of the polarization state of the fluorescence. That is, the polarization separation layer 441 has a wavelength selective polarization separation characteristic that allows separation of the s-polarized light and p-polarized light contained in light having wavelengths that belong to the blue light region from each other and transmission of the s-polarized light and p-polarized light contained in light having wavelengths that belong to the green and red light regions.

The light combiner 44, which also functions as a light separator as described above, transmits the p-polarized light out of the light source light incident via the homogenizer optical apparatus 43 toward the second retardation element 45 along the first illumination optical axis Ax1 and reflects the s-polarized light out of the light source light toward the second light collection element 46 along the second illumination optical axis Ax2. Although will be described later in detail, the light combiner 44 combines the light source light incident via the second retardation element 45 with the fluorescence incident via the second light collection element 48.

Configurations of Second Retardation Element and First Light Collection Element

The second retardation element 45 is a quarter wave plate, converts the p-polarized light source light incident via the light combiner 44 into circularly polarized light source light, and converts the light source light incident via the first light collection element 46 (circularly polarized light having polarization axis rotating in the direction opposite the direction in which polarization axis of incident circularly polarized light rotates) into s-polarized light.

The first light collection element 46 collects (focuses) the light source light having passed through the second retardation element 45 on the light diffuser 47. The first light collection element 46 is formed of three lenses 461 to 463 in the present embodiment, but the number of lenses that form the first light collection element 46 is not limited to three.

Configuration of Light Diffuser

The light diffuser 47 diffuses the light source light incident thereon in the same diffusion angle as that of the fluorescence produced by and outputted from the wavelength converter 49. The light diffuser 47 includes a disc-shaped light diffusing element 471, on which an annular reflection layer is formed around the center of rotation, and a rotator 472, which rotates the light diffusing element 471. The reflection layer reflects the light incident thereon in the Lambertian reflection scheme.

The light source light diffused by and reflected off the thus configured light diffusing element 471 is incident again on the second retardation element 45 via the first light collection element 46. The circularly polarized light incident on the light diffusing element 471 is converted, when reflected off the light diffusing element 471, into circularly polarized light the polarization axis of which rotates in the opposite direction, and passes through the second retardation element 45, which converts the circularly polarized light into s-polarized light source light, the polarization axis of which is rotated by 90° with respect to the polarization axis of the p-polarized light source light having passed through the light combiner 44. The s-polarized light source light is reflected off the polarization separation layer 441 described above, travels as blue light along the second illumination optical axis Ax2, and enters the homogenizing apparatus 32, which will be described later.

Configuration of Second Light Collection Element

The s-polarized light source light having passed through the homogenizer optical apparatus 43 and having been reflected off the polarization reflection layer 441 described above enters the second light collection element 48. The second light collection element 48 not only collects the light source light having entered the second light collection element 48 on the illuminated region (wavelength conversion layer 493, which will be described later) of the wavelength converter 49, but parallelizes the fluorescence outputted from the wavelength converter 49 and causes the fluorescence to exit toward the polarization separation layer 441 described above. The second light collection element 48 is formed of three lenses 481 to 483, but the number of lenses provided in the second light collection element 48 is not limited to three, as in the case of the first light collection element 46.

Configuration of Wavelength Converter

The wavelength converter 49 converts the wavelength of light incident thereon. In the present embodiment, the wavelength converter 49 converts in terms of wavelength the incident blue light (light source light) into fluorescence (converted light) containing green light and red light. The wavelength converter 49 includes a wavelength conversion element 491, a rotator 495, which rotates the wavelength conversion element 491, and a heat dissipating member 496, which dissipates heat transferred from the wavelength conversion element 491.

The wavelength conversion element 491 includes a disc-shaped support 492, a wavelength conversion layer 493, which is located on a surface 492A of the support 492, which is the surface on which the light source light is incident, and a reflection layer 494.

The wavelength conversion layer 493 is a phosphor layer containing a phosphor that is excited by the light source light described above incident thereon to diffusively emit fluorescence (fluorescence having intensity that peaks at wavelength, for example, in wavelength region from 500 to 700 nm), which is non-polarized light. Part of the fluorescence produced by the wavelength conversion layer 493 exits toward the second light collection element 48, and the other part exits toward the reflection layer 494.

The reflection layer 494 is disposed between the wavelength conversion layer 493 and the support 492 and reflects the fluorescence incident from the wavelength conversion layer 493 toward the second light collection element 48.

When the thus configured wavelength conversion element 491 is irradiated with the light source light described above, the wavelength conversion element 491 diffusively emits the fluorescence described above toward the second light collection element 48. The fluorescence is incident on the polarization separation layer 441 described above via the second light collection element 48, passes through the polarization separation layer 441 along the second illumination optical axis Ax2, and enters the homogenizing apparatus 32. That is, the fluorescence, when passing through the polarization separation layer 441, is combined with the blue light source light reflected off the polarization separation layer 441, and the combined light enters as illumination light the homogenizing apparatus 32.

The wavelength conversion layer 493 generates heat when the light source light is incident thereon, and the heat generated in the wavelength conversion layer 493 is transferred to the support 492 via the reflection layer 494. The heat transferred to the support 492 is dissipated via the heat dissipating member 496, which is connected to a surface 492B of the support 492, which is the surface opposite the surface 492A.

Part of the components of the light source apparatus 31 is disposed in a second sealed enclosure 541 (see FIG. 3), which is a roughly sealed enclosure. Although will be described later in detail, out of the components of the light source apparatus 31, a fourth refrigerant RE4 in the second sealed enclosure 541 flows via the light diffuser 47 and the wavelength converter 49, which are cooling targets, whereby the cooling targets are cooled.

Configurations of Homogenizing Apparatus and Color Separation Apparatus

The homogenizing apparatus 32 shown in FIG. 1 homogenizes the illuminance in a plane perpendicular to the center axis of the light flux outputted from the light source apparatus 31. The homogenizing apparatus 32 includes a retardation element 320, which is a half wave plate, a UV filter 321, a first lens array 322, a light adjusting apparatus 323, a second lens array 324, a polarization conversion element 325, and a superimposing lens 326. Out of the components described above, the polarization conversion element 325 aligns the polarization directions of light incident thereon with one another.

The color separation apparatus 33 separates the light flux incident from the homogenizing apparatus 32 into three color light fluxes, red (R) light, green (G) light, and blue (B) light. The color separation apparatus 33 includes dichroic mirrors 331 and 332, reflection mirrors 333 to 336, and a relay lens 337.

Configuration of Electrooptical Apparatus

The electrooptical apparatus 34 modulates the separated color light fluxes and then combines the modulated color light fluxes with one another to form image light to be projected by the projection optical apparatus 35. The electrooptical apparatus 34 includes field lenses 341 and light modulators 342 provided on a color light basis and one color combiner 343.

Out of the components described above, the light modulators 342 (reference characters 342R, 342G, and 342B denote light modulators for red light, green light, and blue light, respectively) each include a liquid crystal panel CP (see FIG. 3), which modulates color light incident thereon via the corresponding field lens 341, and a light-incident-side polarizer IP and a light-exiting-side polarizer EP (see FIG. 3), which are located on the light incident side and the light exiting side of the liquid crystal panel. That is, the light modulators 342 are each formed of a liquid crystal light valve.

The color combiner 343 is formed of a cross dichroic prism formed in a roughly rectangular columnar shape. The color combiner 343 has three light incident surfaces on which the color light fluxes having passed through the light modulators 342 and a light exiting surface through which the image light, which is the combination of the color light fluxes, exits. The light exiting surface faces the projection optical apparatus 35.

Although not illustrated in detail, the liquid crystal panel CP and the light-exiting-side polarizer EP that form each of the light modulators 342 and the color combiner 343 are integrated with one another by a holding member.

Configurations of Projection Optical Apparatus and Optical Part Enclosure

The projection optical apparatus 35 enlarges and projects the image light combined by the color combiner 343. The projection optical apparatus 35 can be an assembled lens formed of a plurality of lenses arranged in a lens barrel.

The optical part enclosure 36 is a box-shaped enclosure having an illumination optical axis Ax set therein. The light source apparatus 31, the homogenizing apparatus 32, the color separation apparatus 33, and the electrooptical apparatus 34 are each disposed in a position on the illumination optical axis Ax in the optical part enclosure 36. The projection optical apparatus 35 is located in a position outside the optical part enclosure 36 but disposed in accordance with the illumination optical axis Ax.

The thus configured optical part enclosure 36 is combined with another enclosure to form a first sealed enclosure 511, which forms a first circulation channel 51, which will be described later. The first sealed enclosure 511 forms a first space S1, the interior of which is roughly sealed, and the electrooptical apparatus 34 and the polarization conversion element 325 described above are disposed in the first space S1. Part of the first sealed enclosure 511 (first space S1) is formed by the field lenses 341 fit in grooves (not shown) formed in the optical part enclosure 36.

Configuration of Cooling Apparatus

Figure 3:
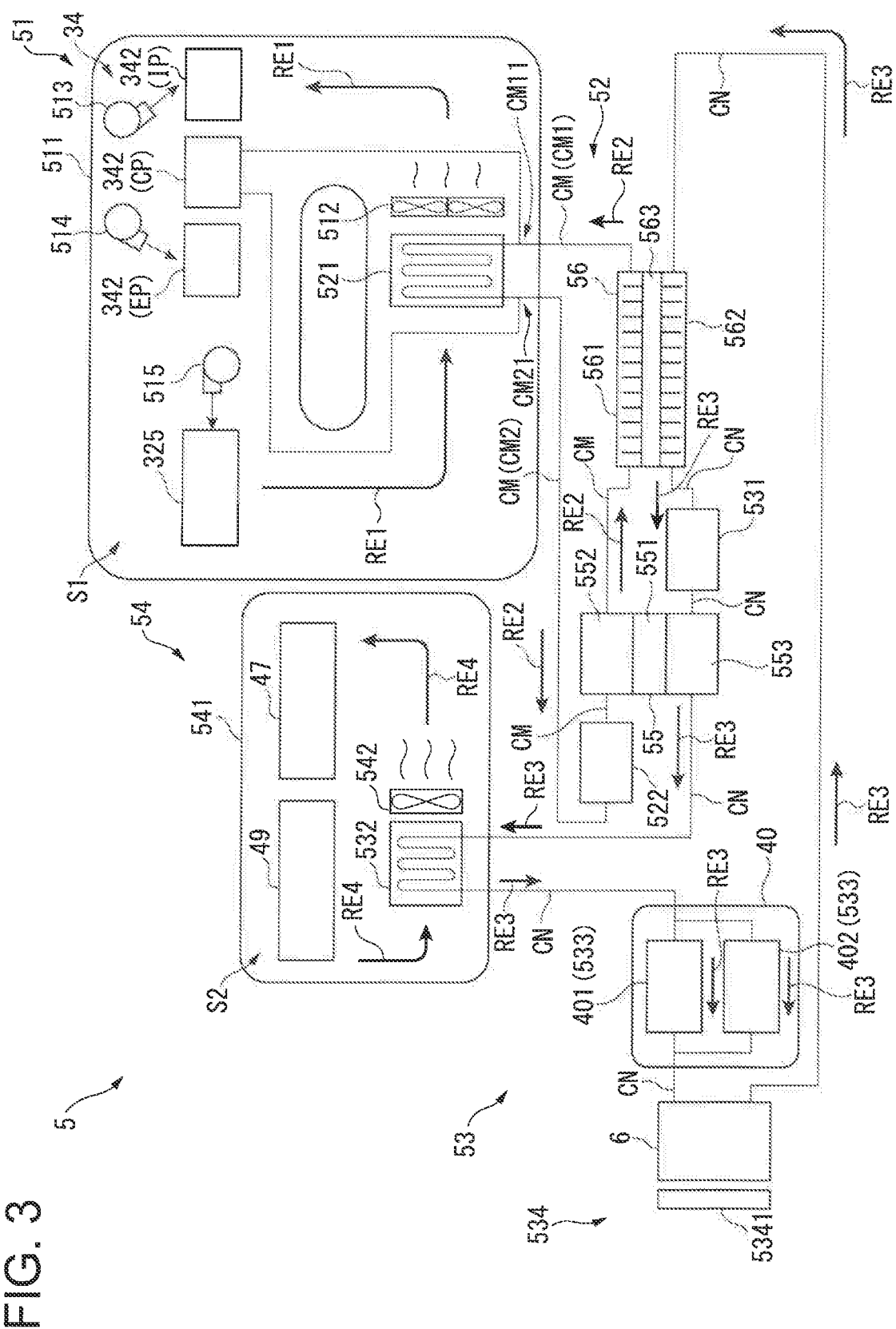
FIG. 3 is a diagrammatic view showing the configuration of a cooling apparatus in the first embodiment.

FIG. 3 is a diagrammatic view showing the configuration of a cooling apparatus 5.

The projector 1 includes the cooling apparatus 5, which is disposed in the exterior enclosure 2, as well as the configuration described above. The cooling apparatus 5 includes a first circulation channel 51, a second circulation channel 52, a third circulation channel 53, and a fourth circulation channel 54, as shown in FIG. 3.

Configuration of First Circulation Channel

The first circulation channel 51 is a channel through which a first refrigerant RE1, which is a gas in the first sealed enclosure 511 described above, circulates, and the first circulation channel 51 cools a first cooling target by using the first refrigerant RE1. The first circulation channel 51 includes the first sealed enclosure 511, a circulation fan 512 and blower fans 513 to 515, and a first heat exchanger 521.

The first refrigerant RE1 only needs to be a gas and may be any gas other than air (such as nitrogen gas and helium gas).

The first sealed enclosure 511 is the combination of the optical part enclosure 36 and another enclosure and forms the first space S1 therein, as described above. The polarization conversion element 325 and the light modulators 342, which are each the first cooling target described above, are disposed in the first space S1.

In addition, the circulation fan 512, the blower fans 513 to 515, and the first heat exchanger 521 are disposed in the first space S1. Out of the components described above, the first heat exchanger 521 transfers heat of the first refrigerant RE1 to a second refrigerant RE2, which flows through the first heat exchanger 521, to cool the first refrigerant RE1 and forms not only the first circulation channel 51 but the second circulation channel 52, which will be described later.

The circulation fan 512 is a fan that circulates the first refrigerant RE1 and is disposed in the vicinity of the first heat exchanger 521. The circulation fan 512 delivers the first refrigerant RE1 cooled by the first heat exchanger 521 toward the light modulators 342.

The blower fans 513 and 514 deliver the first refrigerant RE1 to the light modulators 342. Out of the two blower fans, the blower fan 513 delivers the first refrigerant RE1 to the liquid crystal panel OP and the light-exiting-side polarizer EP of each of the light modulators 342, and the blower fan 514 delivers the first refrigerant RE1 to the light-incident-side polarizer IP and the liquid crystal panel CP of each of the light modulators 342. The blower fans 513 and 514 are provided for each of the light modulators 342 in the present embodiment.

The blower fan 515 delivers the first refrigerant RE1 to the polarization conversion element 325.

In the thus configured first circulation channel 51, the first refrigerant having cooled the first cooling target described above is sucked by the circulation fan 512 described above, cooled by the first heat exchanger 521, and then delivered again toward the light modulators 342. The first refrigerant RE1 thus circulates through the first circulation channel 51 formed in the first sealed enclosure 511.

Configuration of Second Circulation Channel

The second circulation channel 52 is a channel through which the second refrigerant RE2, which is a liquid refrigerant, circulates, and the second circulation channel 52 cools the first refrigerant RE1. The second circulation channel 52 includes the first heat exchanger 521, a tank 522, a pump 55 (inflow chamber 552) and a second heat exchanger 56 (heat receiver 561), a light modulator cool section (not shown), and a plurality of connection members CM, which connect the components described above to each other.

The plurality of connection members CM are each a tubular member so formed as to allow the second refrigerant RE2 to flow therethrough. The second refrigerant RE2 can, for example, be water and an antifreezing liquid, such as propylene glycol.

The first heat exchanger 521 is disposed in the first sealed enclosure 511 and transfers the heat of the first refrigerant RE1 described above to the second refrigerant RE2, which flows through the first heat exchanger 521, to cool the first refrigerant RE1.

The tank 522 temporarily stores the second refrigerant RE2. The second refrigerant RE2 stored in the tank 522 is sucked by the pump 55.

The pump 55 includes a pumping section 551 and inflow chambers 552 and 553.

The second refrigerant RE2 flows from the tank 522 into the inflow chamber 552. The second refrigerant RE2 having flowed into the inflow chamber 552 is so driven by the pumping section 551 as to flow through the heat receiver 561 of the second heat exchanger 56 into the first heat exchanger 521.

A third refrigerant RE3, which circulates in the third circulation channel 53, which will be described later, flows into the inflow chamber 553. The third refrigerant RE3 having flowed into the inflow chamber 553 is so driven by the pumping section 551 as to be pumped to a third heat exchanger 532.

The second heat exchanger 56 includes the heat receiver 561, through which the second refrigerant RE2 pumped from the pump 55 flows, a heat dissipater 562, through which the third refrigerant RE3 flows, and a heat transferring section 563, which transfers the heat of the second refrigerant RE2, which is the heat received by the heat receiver 561, to the heat dissipater 562. The second refrigerant RE2 having passed through the second heat exchanger 56, which transfers the heat of the second refrigerant RE2 to the third refrigerant RE3 so that the second refrigerant RE2 is cooled, flows to the first heat exchanger 521 described above.

Out of the plurality of connection members CM, a connection member CM1, through which the second refrigerant RE2 cooled by the second heat exchanger 56 flows, has a brancher CM11, which causes part of the second refrigerant 552 flowing through the connection member CM1 to flow to the first heat exchanger 521 and the other part of the second refrigerant RE2 to flow to the light modulators 342. That is, the light modulators 342 are each cooled also by the light modulator cooling section (not shown), which is provided in the light modulator and through which the second refrigerant RE2 flows.

Out of the plurality of connection Members CM, a connection member CM2, through which the second refrigerant RE2 flows into the tank 522, includes a merger CM21, which merges the second refrigerant RE2 having flowed through the first heat exchanger 521 and the second refrigerant RE2 having flowed via the light modulators 342.

In the thus configured second circulation channel 52, the second refrigerant Rig stored in the tank 522 is sucked by the pump 55 and pumped to the second heat exchanger 56. The second refrigerant RE2 having flowed through the heat receiver 561 of the second heat exchanger 56 and has been therefore cooled is branched by the connection member CM1 described above to the first heat exchanger 521 and the light modulator cooling section described above provided to the light modulators 342. The second refrigerant RE2 to which the heat from the first heat exchanger 521 has been transferred and the second refrigerant RE2 to which the heat of the light modulators 342 has been transferred via the light modulator cooling section flow through the connection member CM2 into the tank 522 and are stored in the tank 522 again. The heat of the second refrigerant RE2 is transferred to the third refrigerant RE3 by the second heat exchanger 56, as described above.

Configuration of Fourth Circulation Channel

The fourth circulation channel 54 will first be described before the third circulation channel 53.

The fourth circulation channel 54 is a channel through which the fourth refrigerant RE4, which is a gas in the second sealed enclosure 541, circulates to cool a cooling target located in the second sealed enclosure 541. The fourth circulation channel 54 includes the second sealed enclosure 541, a circulation fan 542, which is disposed in the second sealed enclosure 541, and the third heat exchanger 532. The fourth refrigerant RE4 may be made of the same component as the component of the first refrigerant RE1 or may be made of a component different from the component of the first refrigerant RE1.

The second sealed enclosure 541 forms a roughly sealed second space S2 therein. Part of the components of the light source apparatus 31 described above (light diffuser 47 and wavelength converter 49 in present embodiment) is disposed in the second sealed enclosure 541, whereby dust having entered the exterior enclosure 2 will not adhere to the light diffuser 47 or the wavelength converter 49.

The third heat exchanger 532, through which the third refrigerant RE3 flows, is disposed in the second sealed enclosure 541, and the third heat exchanger 532 cools the fourth refrigerant RE4 in the second sealed enclosure 541. The third heat exchanger 532 therefore not only forms the fourth circulation channel 54 but forms the third circulation channel 53.

The circulation fan 542 is a fan that circulates the fourth refrigerant RE4 in the second sealed enclosure 541. The circulation fan 542 is disposed in the vicinity of the third heat exchanger 532 and causes the fourth refrigerant RE4 cooled by the third heat exchanger 532 to flow to the light diffuser 47 and the wavelength converter 49 to cool the two components 47 and 49.

FIG. 3 shows that the fourth refrigerant RE4 flows via the light diffuser 47 and then flows via the wavelength converter 49, but not necessarily, and the order in which the fourth refrigerant RE4 flows via the two components may be inverse. The fourth refrigerant RE4 may instead be branched into two portions; one flows to the light diffuser 47, and the other flows to the wavelength converter 49.

Configuration of Third Circulation Channel

The third circulation channel 53 is a channel through which the third refrigerant RE3, which is a liquid refrigerant to which the heat of the second refrigerant RE2 is transferred by the second heat exchanger 56 described above (in other words, third refrigerant RE3 that cools second refrigerant RE2). The third circulation channel 53 is also a channel that cools the light source section 40 of the light source apparatus 31. The third circulation channel 53 includes a tank 531, the pump 55 (inflow chamber 553), the third heat exchanger 532, light source coolers 533, a cooling structure 534 and the second heat exchanger 56 (heat dissipater 562), and a plurality of connection members CN, which connect the components described above to each other.

Out of the components described above, the plurality of connection members CN are each a tubular member that allows the third refrigerant RE3 to flow therethrough. The third refrigerant RE3 may be made of the same component as the component of the second refrigerant RE2 or may be made of a component different from the component of the second refrigerant RE2.

The tank 531 is connected to the heat dissipater 562 of the second heat exchanger 56 described above and temporarily stores the third refrigerant RE3.

The pump 55 using the pumping section 551 pumps the third refrigerant RE3 having flowed from the tank 531 into the inflow chamber 553 to the third heat exchanger 532, as described above.

A channel through which the third refrigerant RE3 flows is formed in the third heat exchanger 532. The third heat exchanger 532 transfers the heat of the fourth refrigerant RE4, which circulates in the second sealed enclosure 541, to the third refrigerant RE3 to cool the fourth refrigerant RE4. The third refrigerant RE3 having flowed through the thus configured third heat exchanger 532 flows to the light source coolers 533.

The light source coolers 533 are each a heat exchanger that forms part of the solid-state light source array SA (see FIG. 2) of the corresponding one of the first light source section 401 and the second light source section 402 described above and transfers heat of the light source section 401 or 402 to the third refrigerant RE3 to cool the light source section 401 or 402. The light source coolers 533, although not illustrated in detail, are each a heat conductive member that forms the solid-state array SA and supports the plurality of solid-state light sources 55 described above, and a plurality of channels that allow the third refrigerant RE3 to flow therethrough are formed in the light source cooler 533. The third refrigerant RE3 having flowed through the third heat exchanger 532 is supplied to the light source coolers 533 to cool the light source sections 401 and 402. The third refrigerant RE3 having cooled the light source section 401 and the third refrigerant RE3 having cooled the light source section 402 merge, and the resultant third refrigerant RE3 flows to a heat exchanging apparatus 6 in the cooling structure 534.

The third refrigerant RE3 may instead not be branched but may be supplied first to one of the light source cooler 533 that forms the first light source section 401 and the light source cooler 533 that forms the second light source sect on 402 and then supplied to the other.

The cooling structure 534 includes a cooling fan 5341 and the heat exchanging apparatus 6, which cool the third refrigerant RE3.

The cooling fan 5341 delivers a fifth refrigerant, which is a cooling gas in the exterior enclosure 2, to the heat exchanging apparatus 6. The fifth refrigerant to which the heat of the third refrigerant RE3 has been transferred by the heat exchanging apparatus 6 is discharged out of the exterior enclosure 2 described above via a discharge port located on the exterior enclosure 2. The number of cooling fan 5341 is not limited to one and may instead be plural.

Although will be described later in detail, the heat exchanging apparatus 6 transfers the heat of the third refrigerant RE3 to the fifth refrigerant described above to cool the third refrigerant RE3 in the course in which the third refrigerant RE3 flowing from the light source coolers 533 flows through the heat exchanging apparatus. The cooled third refrigerant RE3 flows to the heat dissipater 562 of the second heat exchanger 56 described above.

In the thus configured third circulation channel 53, the third refrigerant RE3 stored in the tank 531 is pumped by the pump 55 and supplied to the third heat exchanger 532 in the second sealed enclosure 541. The third heat exchanger 532 cools the fourth refrigerant RE4 in the second sealed enclosure 541. The third refrigerant RE3 having flowed through the third heat exchanger 532 flows through the light source coolers 533 described above to cool the solid-state light sources SS in the first light source section 401 and the second light source section 402. The third refrigerant RE3 having cooled the light source sections 401 and 402 is supplied to the cooling structure 534, is cooled by the heat exchanging apparatus 6, and then flows to the heat dissipater 562 of the second heat exchanger 56. The third refrigerant RE3 to which the heat of the second refrigerant RE2 has been transferred by the heat dissipater 562 is stored in the tank 531 again.

Configuration of Heat Exchanging Apparatus

Figure 4:
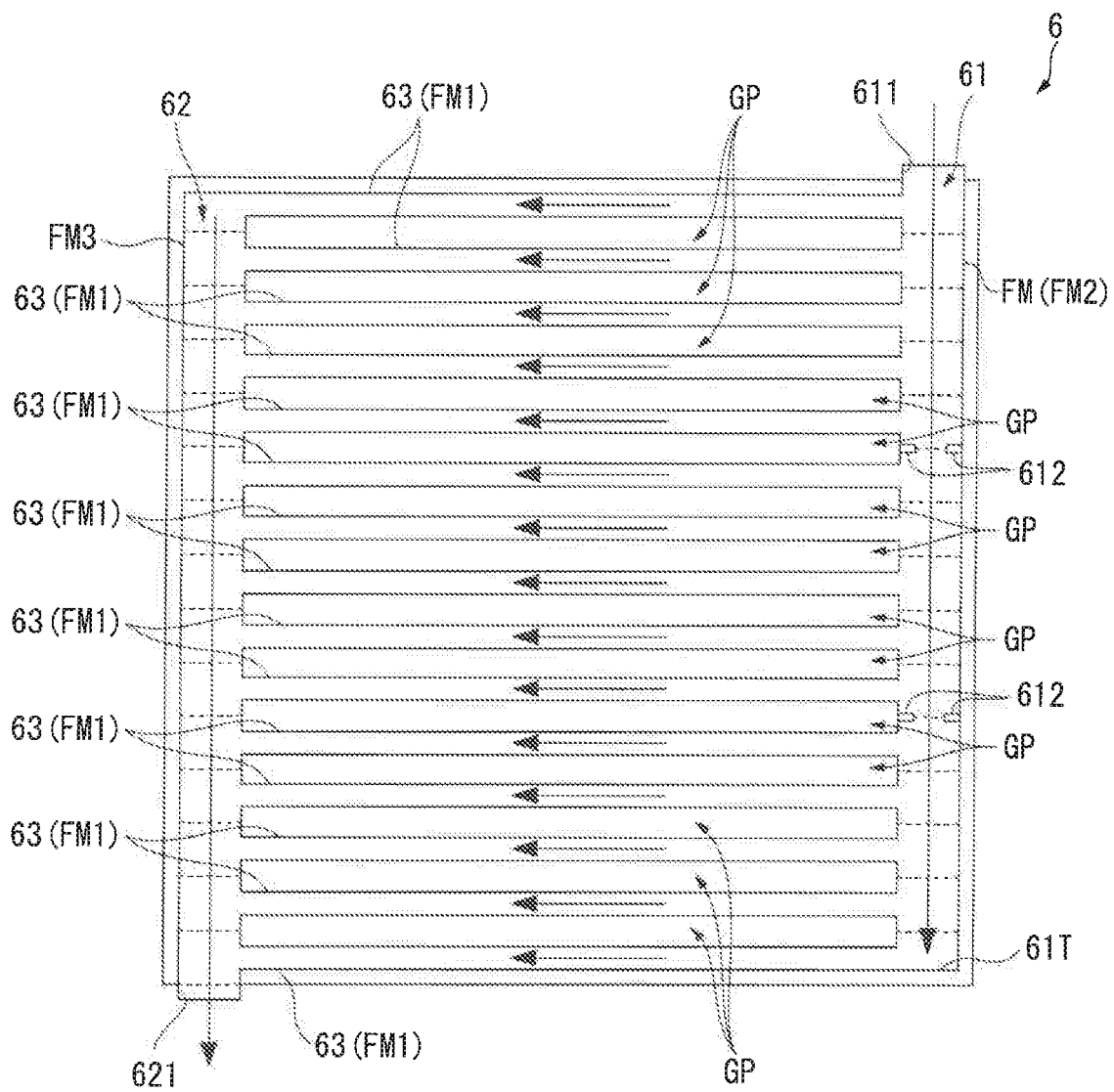
FIG. 4 is a diagrammatic view showing the internal configuration of a heat exchanging apparatus in the first embodiment.

FIG. 4 is a diagrammatic view showing the internal configuration of the heat exchanging apparatus 6.

The heat exchanging apparatus 6 is connected to the light source coolers 533 via one of the connection members CN, is connected to the heat dissipater 562 of the second heat exchanger 56 described above via another connection member CN, and transfers the heat of the third refrigerant RE3 flowing through the heat exchanging apparatus 6 to the fifth refrigerant caused to flow by the cooling fan 5341 described above to cool the third refrigerant RE3. The thus configured heat exchanging apparatus 6 includes an inflow channel 61, an outflow channel 62, and a plurality of channels 63, which connect the inflow channel 61 to the outflow channel 62, as shown in FIG. 4.

In the following description, a +X direction, a +Y direction, and a +Z direction perpendicular to one another are defined; the +X direction is the leftward direction in the heat exchanging apparatus 6 (leftward in the plane of view of FIG. 4), the +Y direction is the downward direction in the heat exchanging apparatus 6 (downward in the plane of view of FIG. 4), and the +Z direction is the depth direction in the heat exchanging apparatus 6 (direction toward the far side of the direction perpendicular to the plane of view of FIG. 4). Although not shown, the direction opposite the +X direction is a −X direction. The same holds true for −Y and −Z directions.

The inflow channel 61 is formed in a tubular shape having an inflow port 611, which is located at the −Y-direction-side end and via which the third refrigerant RE3 flows into the inflow channel 61, and a terminal end 61T, which is located on the +Y-direction side, and so disposed that the center axis of the inflow channel 61 extends in the +Y direction. The inflow channel 61 is connected to the light source coolers 533 via one of the connection members CN, and the third refrigerant RE3 having flowed through the light source coolers 533 flows into the inflow channel 61 via the inflow port 611. The third refrigerant RE3 then flows through the inflow channel 61 in the +Y direction. That is, the +Y direction is the direction along the flow direction of the third refrigerant RE3 which flows in the inflow channel 61. In the following description, the flow direction is called an in-inflow-channel flow direction.

The outflow channel 62 has a tubular shape having an outflow port 621, which is located at the +Y-direction-side end and through which the third refrigerant RE3 flows out of the heat exchanging apparatus 6, and a base end located in the −Y direction side. The outflow channel 62 is so disposed that the center axis thereof extends in the flow direction of the third refrigerant RE3 flowing through the inflow channel 61 (+Y direction). That is, the center axes of the inflow channel 61 and the outflow channel 62 are parallel to each other, and the opening side of the inflow port 611 of the inflow channel 61 (−Y direction side) and the opening side of the outflow port 621 of the outflow channel 62 (+Y direction side) are opposite sides of the heat exchanging apparatus 6. The thus configured outflow channel 62 causes the third refrigerant RE3 having flowed through the outflow channel 62 to flow out via the outflow port 621 to the connection member CN connected to the heat dissipater 562 of the second heat exchanger 56.

The plurality of channels 63 are branched off the inflow channel 61, extend in the +X direction, are arranged in the +Y direction (in-inflow-channel flow direction), and connect the inflow channel 61 to the outflow channel 62. Specifically, the −X-direction-side end of each of the channels is connected to the inflow channel 61, and the +X-direction-side end of each of the channels 63 is connected to the outflow channel 62. In detail, one end (−X-direction-side end) of each of tie plurality of channels 63 is connected to the inflow channel 61 over the portion from the inflow port 611 of the inflow channel 61 to the terminal end 61T thereof. The other end (+X-direction-side end) of each of the plurality of channels 63 is connected to the outflow channel 62 over the portion from the base end (−Y-direction-side end) of the outflow channel 62 to the outflow port 621 thereof. The channels 63 are configured to allow, the third refrigerant RE3 to flow therethrough.

The third refrigerant RE3 having flowed through the inflow channel 61 flows into each of the plurality of channels 63, flows in the +X direction, which is the direction in which the channels 63 extend, and flows into the outflow channel 62 described above. That is, the plural it of channels 63 cause the third refrigerant RE3 having flowed from the inflow channel 61 to flow to the outflow channel 62.

Figure 5:
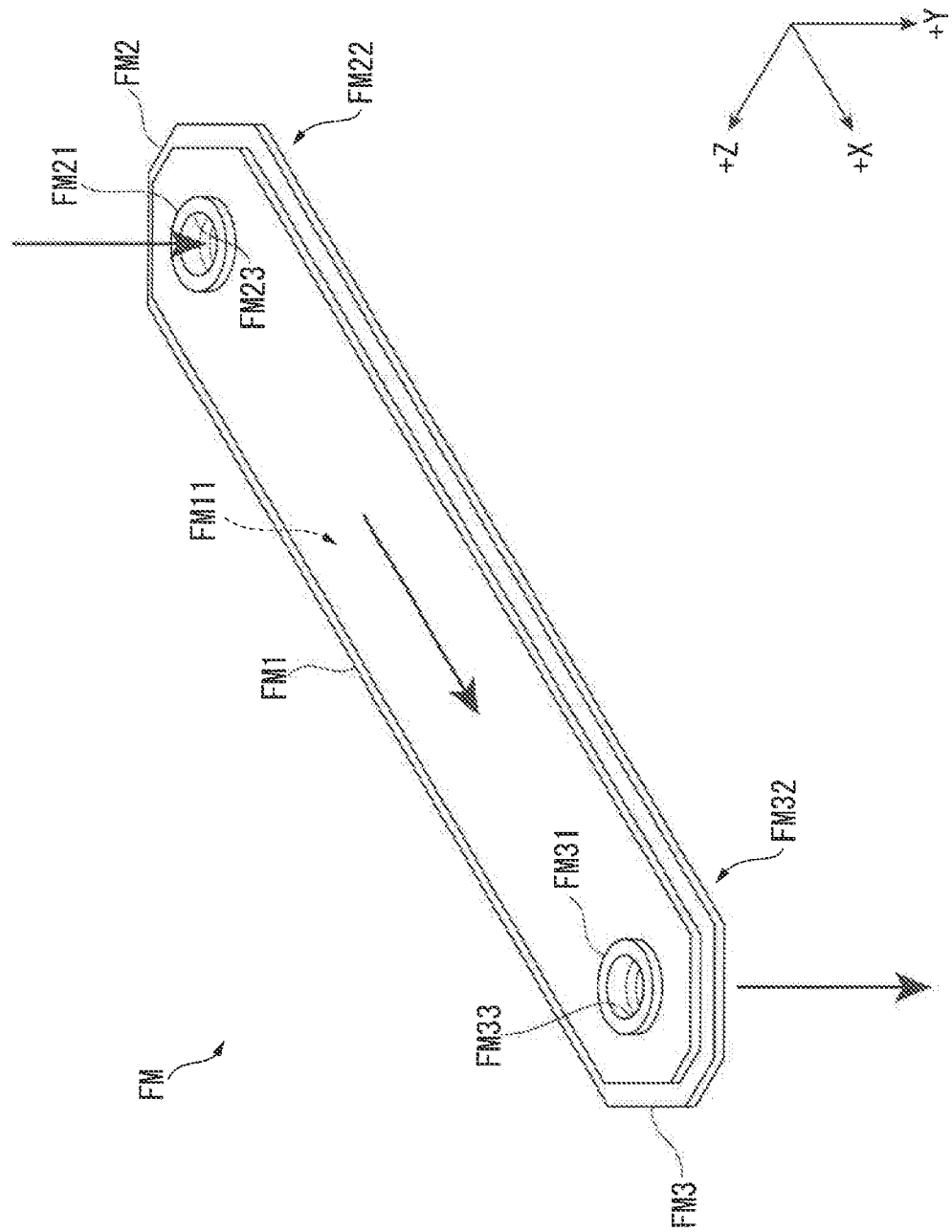
FIG. 5 is a schematic perspective view showing a channel forming member in the first embodiment.

FIG. 5 is a schematic perspective view showing a channel forming member FM.

Part of the heat exchanging apparatus 6 is formed by layering (stacking) the channel forming members FM shown in FIG. 5 in plurality on each other in the thickness direction thereof (+Y direction). In other words, the channel forming member FM shown in FIG. 5 forms part of the inflow channel 61 and the outflow channel 62 and one channel 63.

The channel forming member FM is a plate-shaped member extending in one direction (+X direction) and having roughly the same shaped front and rear sides. The thus shaped channel forming member FM is made of a thermally conductive material such as a metal. The channel forming member FM includes a channel forming section FM1 and connection sections FM2 and FM3, which are located at opposite ends of the channel forming section FM1.

The channel forming member FM has a flat plate shape A channel FM11, which allows a liquid refrigerant to flow therethrough, is formed in the channel forming section FM1, and after a plurality of channel forming members FM are combined with one another to form part of the heat exchanging apparatus 6, the channels FM11 form the channels 63 described above.

The connection section FM2 forms part of the inflow channel 61 of the heat exchanging apparatus 6. The connection section FM2 includes a protruding section FM21, which protrudes in the form of a boss from one surface (+Y-direction-side surface) of the channel forming section FM1, a protruding section FM22, which protrudes in the form of a boss from the other surface (+Y-direction-side surface) of the channel forming section FM1, and a through hole FM23, which passes through the protruding sections FM21 and FM22 in the +Y direction.

The protruding section FM21 of the channel forming member FM is connected to the protruding section FM22 of another channel forming member FM facing the protruding section FM21 (−Y-direction side of channel forming member FM). The protruding section FM22 of the channel forming member FM is connected to the protruding section FM21 of another channel forming member FM facing the protruding section FM22 (+Y-direction side of channel forming member FM).

The through hole FM23 is a hole having a roughly circular cross-sectional shape and communicates with the channel FM11 in the channel forming section FM1 described above. Therefore, part of the liquid refrigerant (third refrigerant RE3) having flowed through the −Y-direction-side opening of the through hole FM23 flows out via the +Y-direction-side opening thereof, and the other part of the liquid refrigerant flows into the channel FM11 described above and to the connection section FM3.

The connection section FM3 forms part of the outflow channel 62 of the heat exchanging apparatus 6. The connection section FM3 has the same configuration as that of the connection section FM2 described above. That is, the connection section FM3 includes a protruding section FM31, which protrudes in the form of a boss from one surface (−Y-direction-side surface) of the channel forming section FM1, a protruding section FM32, which protrudes in the form of a boss from the other surface (+Y-direction-side surface) of the channel forming section FM1, and a through hole FM33, which passes through the protruding sections FM31 and FM32 in the +Y direction.

The protruding section FM31 of the channel forming member FM is connected to the protruding section FM32 of another channel forming member FM facing the protruding section FM31. The protruding section FM32 of the channel forming member FM is connected to the protruding section FM31 of another channel forming member FM facing the protruding section FM32. The connection between the protruding sections FM21, FM22, FM31, and FM32 of the channel forming member FM and those of the other channel forming members FM is performed based on bonding or welding.

The through hole FM33 is a hole having a roughly circular cross-sectional shape and communicates with the channel FM11 in the channel forming section FM1 described above. The liquid refrigerant having flowed via the −Y-direction-side opening of the through hole FM33 into the through hole FM33 and the liquid refrigerant having flowed through the channel FM11 merge, and the resultant liquid refrigerant flows out of the through hole FM33 via the +Y-direction-side opening thereof.

In the heat exchanging apparatus 6 described above, which is formed of the plurality of channel forming members FM linked to each other, the inflow channel 61 is formed by the connection sections FM2, the outflow channel 62 is formed by the connection sections FM3, and the plurality of channels 63 are formed by the channels FM11, as described above.

Gaps GP, which allow the fifth refrigerant caused to flow b the cooling fan 5341 described above to flow in the +Z direction, are formed between the channel forming sections FM1 in the heat exchanging apparatus 6, as shown in FIG. 4. When the fifth refrigerant flows through, the gaps GP, the heat of the third refrigerant RE3 is transferred to the fifth refrigerant, whereby the third refrigerant RE3 is cooled.

In the present embodiment, the two outermost channel forming members FM out of the plurality of channel forming members FM, which form the heat exchanging apparatus 6, (channel forming member FM closest to −Y-direction side and channel forming member FM closest to +Y-direction side) are so configured that one of the through hole FM23 and the through hole FM33 is closed. More specifically the +Y-direction-side channel forming member FM out of the two outermost channel forming members FM is so formed that the +-direction-side opening (opening of protruding section FM22) of the through hole FM23 is closed, as shown in FIG. 4. Similarly, the −Y-direction-side channel forming member FM out of the two outermost channel forming members FM is so formed that the −Y-direction-side opening (opening of protruding section FM31) of the through hole FM33 is closed. Further, as another form, the +Y-direction-side channel forming member FM may be so configured that no protruding section FM22 is formed but the corresponding-side opening is closed, and the −Y-direction-side channel forming member FM may be so configured that no protruding section FM31 is formed but the corresponding-side opening is closed.

Buffer Section of Inflow Channel

The inflow channel 61 includes a plurality of buffer sections 612 in positions that equally divide the portion from the inflow port 611 to the terminal end 61T in the +Y direction, as shown in FIG. 4. In the present embodiment, two buffer sections 612 are provided.

The buffer sections 612 protrude from the inner wall of the inflow channel 61 inward in the radial direction. The buffer sections 612 are each a diameter reducer that causes the cross-sectional area of the inflow channel 61 in the positions where the buffer sections 612 are located to be smaller than the cross-sectional area of the inflow channel 61 in the other positions where no buffer section 612 is provided and therefore have the function of reducing the flow rate of the third refrigerant RE3 having flowed into the inflow channel 61. That is, since the buffer sections 612 are each the diameter reducer that reduces the diameter of the inflow channel 61, the channel resistance in the in-inflow-channel flow direction against the third refrigerant RE3 flowing via the buffer sections 612 increases, whereby the flow rate of the third refrigerant RE3 decreases. The third refrigerant RE3 therefore readily flows into a plurality of channels 63 connected to a portion in the vicinity of each of the buffer sections 612 (upstream portion).

In the present embodiment, the plurality of buffer sections 612 are each provided on the inner wall of the through hole FM23 of the corresponding channel forming member FM, as shown in FIG. 4, but not necessarily. The buffer sections 612 may, for example, each be so formed that the inner diameter of the overall through hole FM23 of the channel forming member FM is smaller than the inner diameter of the through hole FM23 of each of the other channel forming members FM. The buffer sections 612 may instead each be so configured that a member having an inner diameter smaller than the inner diameter of the through hole FM23, such as a washer, is interposed between the two channel forming members FM connected to each other, specifically, between the protruding section FM22 of the −Y-direction-side channel forming member FM and the protruding section FM21 of the +Y-direction-side channel forming member FM.

Comparison with Heat Exchanging Apparatus Provided with No Buffer Section

A heat exchanging apparatus provided with no buffer section 612 described above will be examined. Although not illustrated, a heat exchanging apparatus having the same configuration as that of the heat exchanging apparatus 6 described above except that no buffer section 612 is provided is referred to as heat exchanging apparatus 6X.

In the heat exchanging apparatus 6X, the third refrigerant RE3 having flowed via the inflow port 611 into the inflow channel 61 flows to the terminal end 61T of the inflow channel 61 with the flow rate of the third refrigerant RE3 not reduced very much. The flow rate of the third refrigerant RE3 therefore decreases at the terminal end 61T of the inflow channel 61. Therefore, out of the plurality of channels 63, the third refrigerant RE3 readily flows through the channels 63 connected to the inflow channel 61 in positions in the vicinity of the terminal end 61T, but the third refrigerant RE3 does not readily flow through the channels 63 connected to the inflow channel 61 in positions far away from the portion in the vicinity of the terminal end 61T (positions in vicinity of inflow port 611, for example). This phenomenon is referred to as drift.

When the drift occurs, a larger amount of third refrigerant RE3 flows into the channels 63 located on the side facing the terminal end 61T of the inflow channel 61, whereas a smaller amount of third refrigerant RE3 flows into the channels 63 located on the side facing the inflow port 611 of the inflow channel 61, so that the third refrigerant RE3 cannot be efficiently cooled (heat cannot be efficiently transferred to fifth refrigerant described above, which is gas refrigerant).

In contrast, in the heat exchanging apparatus 6 described above, in which the inflow channel 61 is provided with the buffer sections 612 described above, the flow rate of the third refrigerant RE3 having flowed into the inflow channel 61 decreases at the buffer sections 612. The third refrigerant RE3 therefore readily flows into the channels 63 connected to a portion on the upstream side of the buffer sections 612 in the flow direction of the third refrigerant RE3.

Further, when the third refrigerant RE3 passes via the buffer sections 612 and reaches the terminal end 61T of the inflow channel 61, the flow rate of the third refrigerant RE3 also decreases at the terminal end 61T, the third refrigerant RE3 therefore readily flows into the channels 63 connected to a portion in the vicinity of the terminal end 61T.

As described above, in the heat exchanging apparatus 6, since the third refrigerant RE3 therefore readily flows into all the channels 63, the efficiency at which the third refrigerant RE3 is cooled can be improved as compared with the efficiency at which the third refrigerant RE3 is cooled by the heat exchanging apparatus 6X.

Effects of First Embodiment

The projector 1 according to the present embodiment described above can provide the following effects.

In the heat exchanging apparatus 6, the third refrigerant RE3 having flowed into the inflow channel 61 via the inflow port 611 flows through the plurality of channels 63 arranged in the flow direction (+Y direction) of the third refrigerant RE3 flowing through the inflow channel 61, flows into the outflow channel 62, and exits out of the heat exchanging apparatus 6 via the outflow port 621. In this process, since the buffer sections 612 are located in the portion from the inflow port 611 to the terminal end 61T, the flow rate of the third refrigerant RE3 decreases in portions in the vicinity of the buffer sections 612. The third refrigerant RE3 can therefore readily flow not only into the channels 63 connected to the portion in the vicinity of the terminal end 61T but the channels 63 connected to the portion in the vicinity of the buffer sections 612. The third refrigerant RE3 can therefore readily flow into each of the channels 63, whereby the efficiency at which the third refrigerant RE3 is cooled can be improved.

Further, since the heat exchanging apparatus 6 is not required to include headers, such as those shown in JP-A-2006-234255 and JP-A-2006-132819 described above, the size of heat exchanging apparatus 6 can be reduced as compared with a configuration including the headers.

The buffer sections 612 cause the cross-sectional area of the inflow channel 61 in the portions where the buffer sections 612 are located to be smaller than the cross-sectional area of the inflow channel 61 in the portion where no buffer section 612 is provided. The channel resistance in the in-inflow-channel flow direction in the portions in the vicinity of the buffer sections 612 can therefore be reliably increased. The third refrigerant RE3 is therefore reliably allowed to flow into the channels 63 connected to the portions in the vicinity of the buffer sections 612.

The buffer sections 612 are each a diameter reducer that protrudes from the inner wall of the inflow channel 61 inward in the radial direction to reduce the diameter of the inflow channel 61. The thus configured buffer sections 612 can be readily formed. A heat exchanging apparatus 6 that provides the effects described above can therefore be configured without employing a complicated configuration.

A plurality of buffer sections 612 are provided in the inflow channel 61. Since a plurality of portions where the channel resistance in the in-inflow-channel flow direction increases can thus be provided in the inflow channel 61, the third refrigerant RE3 is allowed to efficiently flow through each of the plurality of channels 63 described above. The efficiency at which the heat exchanging apparatus 6 cools the third refrigerant RE3 can therefore be further improved.

The inflow channel 61 and the outflow channel 62 are so disposed as to be parallel to each other. The size of the heat exchanging apparatus 6 can therefore be reduced as compared with a case where the inflow channel 61 and the outflow channel 62 are not to be parallel to each other.

Second Embodiment

A second embodiment of the invention will next be described.

A projector according to the present embodiment has the same configuration as that of the projector 1 described above but differs therefrom in terms of the configuration of the heat exchanging apparatus provided in the third circulation channel 53. In the following description, the same portions or roughly the same portions as those having been already described have the same reference characters and will not be described.

Figure 6:
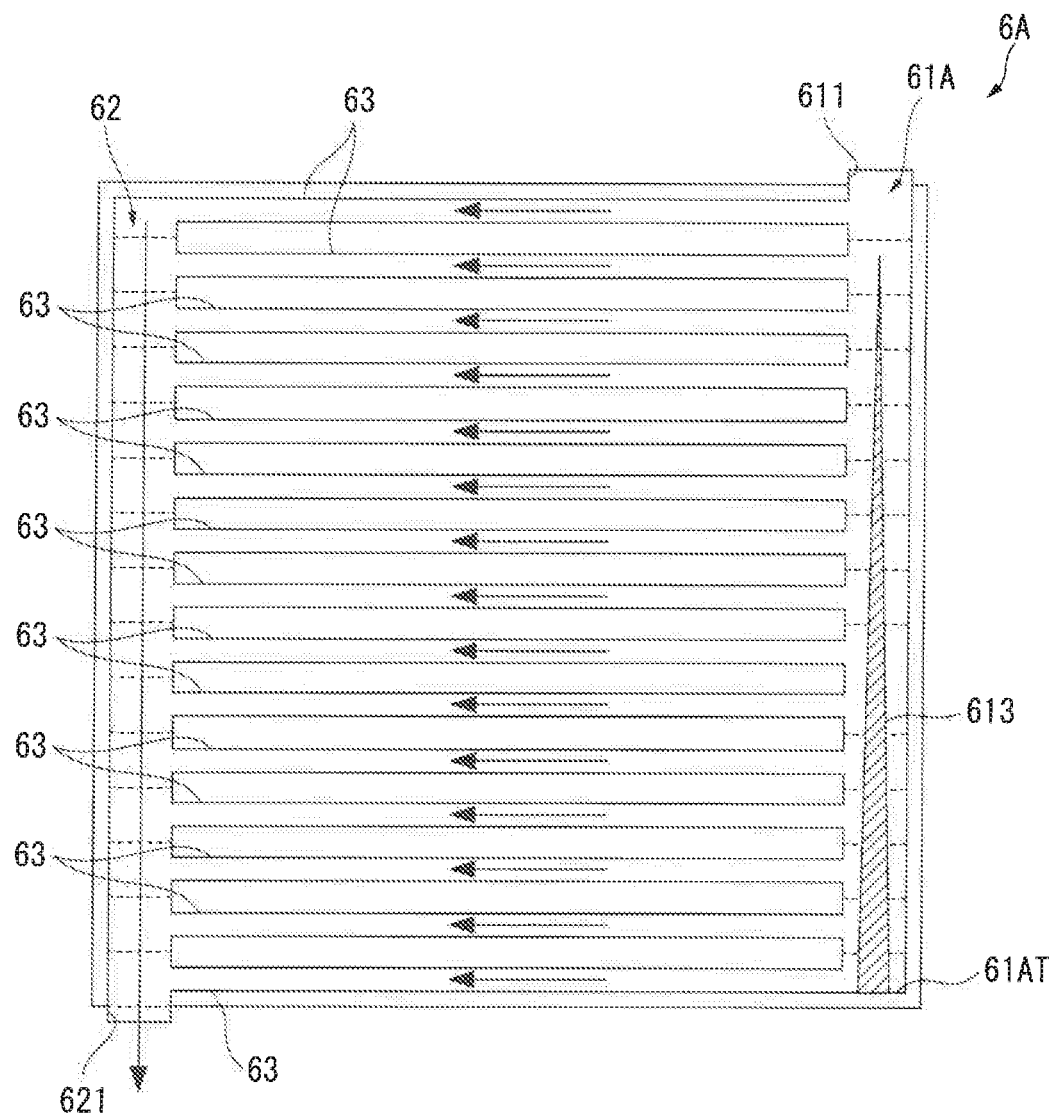
FIG. 6 is a diagrammatic view showing the internal configuration of a heat exchanging apparatus provided in a projector according to a second embodiment of the invention.

FIG. 6 is a diagrammatic view showing the internal configuration of a heat exchanging apparatus 6A provided in the projector according to the present embodiment.

The projector according to the present embodiment has the same configuration and function as those of the projector 1 described above except that the heat exchanging apparatus 6 in the first embodiment is replaced with the heat exchanging apparatus 6A.

The heat exchanging apparatus 6A forms the third circulation channel 53, is connected to the light source coolers 533 described above via one of the connection members CN, is connected to the heat dissipater 562 of the second heat exchanger 56 described above via another connection member CN, and transfers the heat of the third refrigerant RE3 flowing from the light source coolers 533 to the fifth refrigerant to cool the third refrigerant RE3, as in the heat exchanging apparatus 6 described above. The thus configured heat exchanging apparatus 6A includes an inflow channel 61A, the outflow channel 62, and the plurality of channels 63, which connect the inflow channel 61A to the outflow channel 62, as shown in FIG. 6. Part of the heat exchanging apparatus 6A can also be configured by layering the channel forming member FM described above in plurality on each other in the +Y direction. In this case, the plurality of channels 63 are each formed by the channel forming section FM1 described above.

The inflow channel 61A is formed in a tubular shape, and the bottom of the tubular shape forms a terminal end 61AT of the inflow channel 61A, as in the case of the inflow channel 61. The inflow channel 61A has the inflow port 611, which allows the third refrigerant RE3 flow into the inflow channel 61A via one of the connection members CN, and a buffer section 613 in place of the buffer sections 612 in the first embodiment. That is, the heat exchanging apparatus 6A has the same configuration as that of the heat exchanging apparatus 6 described above except that the buffer sections 612 are replaced with the buffer section 613.

The center axis of the inflow channel 61A is parallel to the center axis of the outflow channel 62.

The buffer section 613 reduces the flow rate of the third refrigerant RE3 flowing through the inflow channel 61A in the +Y direction, as do the buffer sections 612 described above. In the present embodiment, the buffer section 613 is formed of a shaft disposed in the inflow channel 61A.

The buffer section 613 has a first portion so configured that the outer diameter of the shaft is a first length and a second portion shifted from the first portion toward the downstream side (+Y-direction side) in the flow direction of the third refrigerant RE3 (in-inflow-channel flow direction) in the inflow channel 61A and so configured that the outer diameter of the shaft is a second length greater than the first length. More specifically, the buffer section 613 is formed in a roughly conical shape that is thin on the upstream side (−Y-direction side) in the in-inflow-channel flow direction and thick on the downstream side (+Y-direction side) in the in-inflow-channel flow direction. That is, the outer diameter of the shaft increases in the in-inflow-channel flow direction (+Y direction). Further, the length of the buffer section 613 (dimension in +Y direction) is at least roughly ⅔ of the length from the inflow port 611 to the terminal end 61AT of the inflow channel 61A in the present embodiment. The length of the buffer section 613 is not limited to the value described above and can be changed as appropriate to any value that allows the third refrigerant RE3 to efficiently flow into the channels 63 on the side facing the inflow port 611. Further, the bottom of the buffer section 613 (bottom of shaft) may or may not be in contact with the terminal end 61AT of the inflow channel 61A.

As for the cross-sectional area of the inflow channel 61A in the portion where the buffer section 613 is located, the cross-sectional area that allows the third refrigerant RE3 to flow therethrough is smaller than the cross-sectional area of the portion where no buffer section 613 is present.

In the thus configured heat exchanging apparatus 6A, the flow rate of the third refrigerant RE3 having flowed into the inflow channel 61A via the inflow port 611 decreases in the portion where the buffer section 613 is located, as in the heat exchanging apparatus 6. Since the buffer section 613 is formed in a roughly conical shape having a diameter that increases toward the downstream side, the channel resistance in the in-inflow-channel flow direction increases toward the downstream side in the flow direction of the third refrigerant RE3 in the inflow channel 61A (+Y-direction side). The front end of the buffer section 613 is located in a position shifted from the center of the inflow channel 61A in the in-inflow-channel flow direction toward the upstream side (side facing inflow port 611), and the bottom of the buffer section 613 is in contact with the terminal end 61AT of the inflow channel 61A. The third refrigerant RE3 can therefore readily uniformly flow through each of the plurality of channels 63 described above as compared with a case where no buffer section 612 is present.

Effects of Second Embodiment

The projector according to the present embodiment described above can provide the following effects as well as the same effects as those provided by the projector 1 described above.

The buffer section 613 is a shaft provided in the inflow channel 61A and has the first portion, which is so configured that the outer diameter of the shaft is the first length, and the second portion, which is shifted from the first portion toward the downstream side in the in-inflow-channel flow direction and so configured that the outer diameter of the shaft is the second length greater than the first length. Therefore, the channel resistance can be increased in the first portion described above and can be further increased in the second portion. Therefore, when the liquid refrigerant flows via the first and second portions, the flow rate of the liquid refrigerant can be gradually reduced. The liquid refrigerant (third refrigerant RE3) can therefore readily flow into, out of the plurality of channels 63, each of the channels 63 connected to the range from the inflow port 611 to the first portion, each of the channels 63 connected to the range from the first portion to the second portion, and each of the channels 63 connected to the range from the second portion to the terminal end 61AT. The efficiency at which the heat exchanging apparatus 6A cools the liquid refrigerant can be therefore further improved.

The outer diameter of the buffer section 613, which is a shaft, increases in the in-inflow-channel flow direction. The cross-sectional area that allows the third refrigerant RE3 to flow therethrough in the inflow channel 61A can therefore be reduced as the third refrigerant RE3 travels in the in-inflow-channel flow direction. The flow rate of the third refrigerant RE3 can therefore be gradually reduced. The third refrigerant RE3 is therefore readily allowed to uniformly flow through each of the channels 63, whereby the efficiency at which the third refrigerant RE3 is cooled can be improved.

Third Embodiment

A third embodiment of the invention will next be described.

A projector according to the present embodiment has the same configuration as that of the projector 1 described above but differs therefrom in terms of the configuration of the heat exchanging apparatus provided in the third circulation channel 53. In the following description, the same portions or roughly the same portions as those having been already described have the same reference characters and will not be described.

Figure 7:
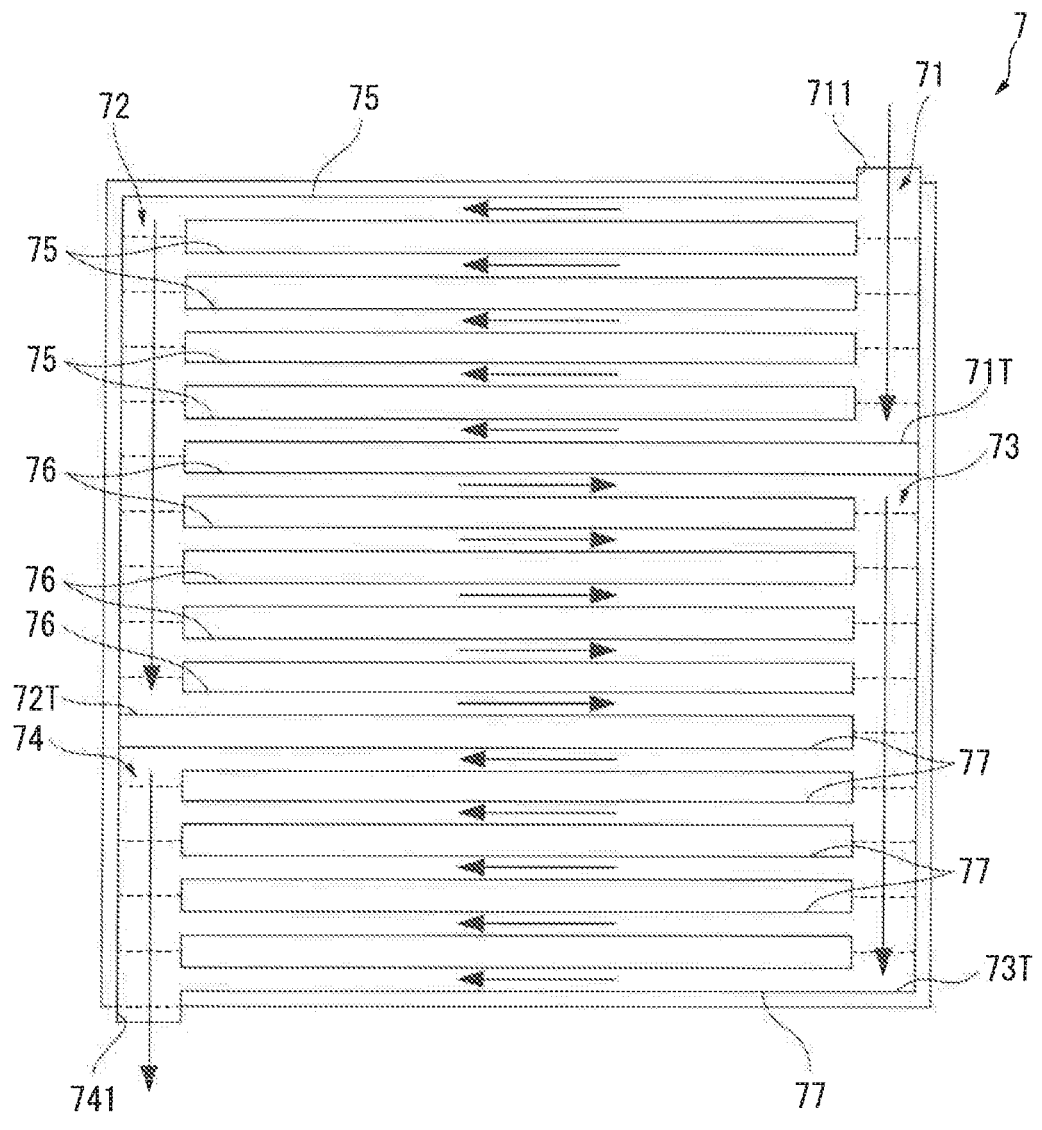
FIG. 7 is a diagrammatic view showing the internal configuration of a heat exchanging apparatus provided in a projector according to a third embodiment of the invention.

FIG. 7 is a diagrammatic view showing the configuration of a heat exchanging apparatus 7 provided in the projector according to the present embodiment.

The projector according to the present embodiment has the same configuration and function as those of the projector 1 described above except that the heat exchanging apparatus 6 in the first embodiment is replaced with the heat exchanging apparatus 7.

The heat exchanging apparatus 7 forms the third circulation channel 53, is connected to the light source coolers 533 described above via one of the connection members CN, is connected to the heat dissipater 562 of the heat exchanger 56 described above via another connection member CN, and transfers the heat of the third refrigerant RE3 which is a liquid refrigerant and flowing from the light source coolers 533 to the fifth refrigerant to cool the third refrigerant RE3, as in the heat exchanging apparatus 6 and 6A described above. The thus configured heat exchanging apparatus 7 includes an inflow channel 71, a first primary channel 72, a second primary channel 73, an outflow channel 74, a plurality of first channels 75, a plurality of second channels 76, and a plurality of third channels 77, as shown in FIG. 7.

The inflow channel 71 is formed in a tubular shape having an inflow port 711, which is located at the −Y-direction-side end and into which the third refrigerant RE3 flows, and a terminal end 71T located on the +Y-direction side, and the flow direction of the third refrigerant RE3 flowing through the inflow channel 71 (in-inflow-channel flow direction or +Y direction) is the direction along the center axis of the inflow channel 71. The plurality of first channels 75 arranged in the in-inflow-channel flow direction are connected to the inflow channel 71 in the portion from the inflow port 711 to the terminal end 71T. The length of the inflow channel 71 in the +Y direction is smaller than the lengths of the inflow channels 61 and 61A in the first and second embodiments described above.

The first primary channel 72 is so disposed that the center axis thereof extends in the in-inflow-channel flow direction (+Y direction). The first primary channel 72 is formed in a tubular shape with the opposite ends in the central axis direction closed, and a terminal end 72T, which is located on the +Y-direction side, is the terminal end of the channel through which the liquid refrigerant in the first primary channel 72 flows A −Y-direction-side portion of the thus configured first primary channel 72 is connected to the plurality of first channels 75 arranged in the +Y direction, and the third refrigerant RE3 having flowed into the inflow channel 71 and flowed through the plurality of first channels flows through the first primary channel 72. A +Y-direction-side portion of the first primary channel 72 is connected to the plurality of second channels 76, which will be described later, and the third refrigerant RE3 having flowed into the first primary channel 72 flows into the plurality of second channels 76.

The plurality of first channels 75 are each a channel through which the third refrigerant RE3 flows, extend in the +X direction, which intersects the +Y direction, which is the in-inflow-channel flow direction described above, and are arranged in the +Y direction. The −X-direction-side end of each of the first channels 75 is connected to the inflow channel 71 in the portion from the inflow port 711 to the terminal end 71T, and the +-X-direction-side end of each of the first channels 75 is connected to the −Y-direction-side portion of the first primary channel 72. The first channels 75 therefore cause the third refrigerant RE3 having flowed from the inflow channel 71 to flow into the first primary channel 72.

The second primary channel 73 is so disposed that the center axis thereof extends in the in-inflow-channel flow direction described above (+Y direction). The second primary channel 73 is formed in a tubular shape with the opposite ends in the central axis direction closed, and a terminal end 73T, which is located on the +Y-direction side, is the terminal end of the channel through which the liquid refrigerant in the second primary channel 73 flows. A −Y-direction-side portion of the thus configured second primary channel 73 is connected to the plurality of second channels 76 arranged in the +Y direction, and the third refrigerant RE3 having flowed through the first primary channel 72 and then flowed through the plurality of second channels 76 flows through the second primary channel 73. A +Y-direction-side portion of the second primary channel 73 is connected to the plurality of third channels 77, which will, be described later, and the third refrigerant RE3 having flowed into the second primary channel 73 flows into the plurality of third channels 77.

The plurality of second channels 76 are each a channel through the third refrigerant RE3 flows, extend in the +X direction, and are arranged in the direction, as in the case of the first channels 75 described above. The +X-direction-side end of each of the second channels 76 is connected to the +Y-direction-side portion of the first primary channel 72, and the −X-direction-side end of each of the second channels 76 is connected to the −Y-direction-side portion of the second primary channel 73. The second channels 76 therefore cause the third refrigerant RE3 having flowed from the first primary channel 72 to flow into the second primary channel 73.

The outflow channel 74 is formed in a tubular shape having an outflow port 741, which is located at the +Y-direction-side end and via which the third refrigerant RE3 flows out of the heat exchanging apparatus 7, and a base end located on the −Y-direction side. The outflow channel 74 is so disposed that the center axis thereof extends in the in-inflow-channel flow direction described above (+Y direction). The plurality of third channels 77, which will be described later, are connected to the thus configured outflow channel 74 in the portion from the base end described above to the outflow port 741. The length of the outflow channel 74 in the +Y direction is smaller than the length of the outflow channel 62 in the embodiments described above.

The plurality of third channels 77 are each a channel through which the third refrigerant RE3 flows, extend in the +X direction, and are arranged in the +Y direction, as in the cases of the first channels 75 and the second channels 76 described above. The −X-direction-side end of each of the third channels 77 is connected to the +Y-direction-side portion of the second primary channel 73, and the +X-direction-side end of each of the third channels 77 is connected to the outflow channel 74 in the portion from the base end (one end) of the outflow channel 74 to the outflow port 741 thereof. The third channels 77 therefore cause the third refrigerant RE3 having flowed from the second primary channel 73 to flow into the outflow channel 74.

In the heat exchanging apparatus 7 according to the present embodiment, the inflow channel 71 and the second primary channel 73 have the same inner diameter. The inflow channel 71 and the second primary channel 73 are so linked to each other that the center axes thereof are parallel to each other, more specifically, the center axes thereof coincide with each other and the inflow channel 71 and the second primary channel 73 are integrated with each other. Direct flow of the third refrigerant RE3 from the inflow channel 71 to the second primary channel 73 is restricted.

Further, the first primary channel 72 and the outflow channel 74 have the same inner diameter. The first primary channel 72 and the outflow channel 74 are so linked to each other that the center axes thereof are parallel to each other, more specifically, the center axes thereof coincide with each other and the first primary channel 72 and the outflow channel 74 are integrated with each other. Direct flow of the third refrigerant RE3 from the first primary channel 72 to the outflow channel 74 is restricted.

Further, the center axes of the inflow channel 71 and the second primary channel 73 are parallel to the center axes of the first primary channel 72 and the outflow channel 74.

The inflow channel 71 and the outflow channel 74 have roughly the same length in the +Y direction, and the first primary channel 72 and the second primary channel 73 have roughly the same length in the +Y direction. Specifically, the length of each of the inflow channel 71 and the outflow channel 74 is roughly ⅓ of the length of the heat exchanging apparatus 7 in the +Y direction (dimension in +Y direction). The length of each of the first primary channel 72 and the second primary channel 73 is roughly ⅔ of the length of the heat exchanging apparatus 7 in the +Y direction (dimension in +Y direction).

In the thus configured heat exchanging apparatus 7, the third refrigerant RE3 having flowed via the inflow port 711, which is located at the −Y-direction-side end of the inflow channel 71, into the inflow channel 71 flows through the first channels 75 in the +X direction and flows into the first primary channel 72. The third refrigerant RE3 flows through the first primary channel 72 in the +Y direction, then flows through the second channels 76 in the −X direction, and flows into the second primary channel 73. The third refrigerant RE3 having reached the second primary channel 73 flows through the second primary channel 73 in the +Y direction, flows through the third channels 77 in the +X direction, and flows into the outflow channel 74. The third refrigerant RE3 is then discharged out of the heat exchanging apparatus 7 via the outflow port 741, which is located at the +Y-direction-side end of the outflow channel 74. The third refrigerant RE3 discharged out of the heat exchanging apparatus 7 flows through the heat dissipater 562 described above via one of the connection members CN.

When the third refrigerant RE3 having flowed into the inflow channel 71 reaches the terminal end 71T of the inflow channel 71, the flow rate of the third refrigerant RE3 at the terminal end 71T decreases. The inflow channel 71 is shorter than the inflow channels 61 and 61A in the first and second embodiments described above. The third refrigerant RE3 therefore flows through all the first channels 75 described above and connected to the inflow channel 71.

When the third refrigerant having flowed through the first channels 75 and flowed into the first primary channel 72 reaches the terminal end 72T of the first primary channel 72, the flow rate of the third refrigerant RE3 at the terminal end 72T decreases. The first primary channel 72 is longer than the inflow channel 71 but shorter than the inflow channels 61 and 61A in the first and second embodiments described above. The third refrigerant RE3 therefore flows through all the second channels 76 described above and connected to the first primary channel 72.

Similarly, when the third refrigerant having flowed through the second channels 76 and flowed into the second primary channel 73 reaches the terminal end 73T of the second primary channel 73, the flow rate of the third refrigerant RE3 at the terminal end 73T decreases. The length of the second primary channel 73 is roughly equal to the length of the first primary channel 72 and shorter than the inflow channels 61 and 61A in the first and second embodiments described above. The third refrigerant RE3 therefore flows through all the third channels 77 described above and connected to the second primary channel 73.

As described above, the third refrigerant RE3 having flowed into the inflow channel 71 efficiently flows through the first channels 75, the second channels 76, and the third channels 77. The third refrigerant RE3 is therefore effectively cooled.

Effects of Third Embodiment

The projector according to the present embodiment described above can provide the same effects as those provided by the projector 1 described above.

The heat exchanging apparatus 7 is so configured that the third refrigerant RE3 having flowed into the inflow channel 71 is caused to flow through the first channels 75, the first primary channel 72, the second channels 76, the second primary channel 73, and the third channels 77 into the outflow channel 74. The configuration described above allows reduction in the length of the inflow channel 71, whereby the third refrigerant RE3 having flowed into the inflow channel 71 to readily flow into each of the plurality of first channels 75. Similarly, the third refrigerant RE3 having flowed into the first primary channel 72 can readily flow into each of the plurality of second channels 76. Further, the third refrigerant RE3 having flowed into the second primary channel 73 can readily flow into each of the plurality of third channels 77. As described above, the third refrigerant RE3 having flowed into the inflow channel 71 can readily flow through the first channels 75, the second channels 76, and the third channels 77, whereby the efficiency at which the third refrigerant RE3 is cooled can be improved.

The inflow channel 71 and the second primary channel 73 are so integrated with each other that the center axes thereof are parallel to each other and coaxial with each other. Further, the first primary channel 72 and the outflow channel 74 are so integrated with each other that the center axes thereof are parallel to each other and coaxial with each other. The configuration described above causes the third refrigerant RE3 that sequentially flows through the inflow channel 71, the plurality of first channels 75, the first primary channel 72, the plurality of second channels 76, the second primary channel 73, the plurality of third channels 77, and the outflow channel 74 to flow through the heat exchanging apparatus 7 along a roughly S-letter-shaped channel when the heat exchanging apparatus 9 is viewed in the −Z direction. The heat exchanging apparatus 7 can therefore be compact as compared with a heat exchanging apparatus so configured that the third refrigerant RE3 flows through the plurality of first channels 75, the plurality of second channels 76, and the plurality of third channels 77 in the same direction.

Variations of Embodiments

The invention is not limited to the embodiments described above, and variations, improvements, and other modifications to the extent that the advantage of the invention is achieved fall within the scope of the invention.

In the embodiments described above, the channels 63 and 75 to 77 described above, which are each formed by the channel forming section FM1 of the channel forming member FM, which forms the heat exchanging apparatus 6, 6A, and 7, are so formed that the third refrigerant RE3, which is a liquid refrigerant, linearly flows in one direction (+X or −X direction), but not necessarily, and the third refrigerant RE3 may not linearly flow through the channels 63 or 75 to 77.

Figure 8:
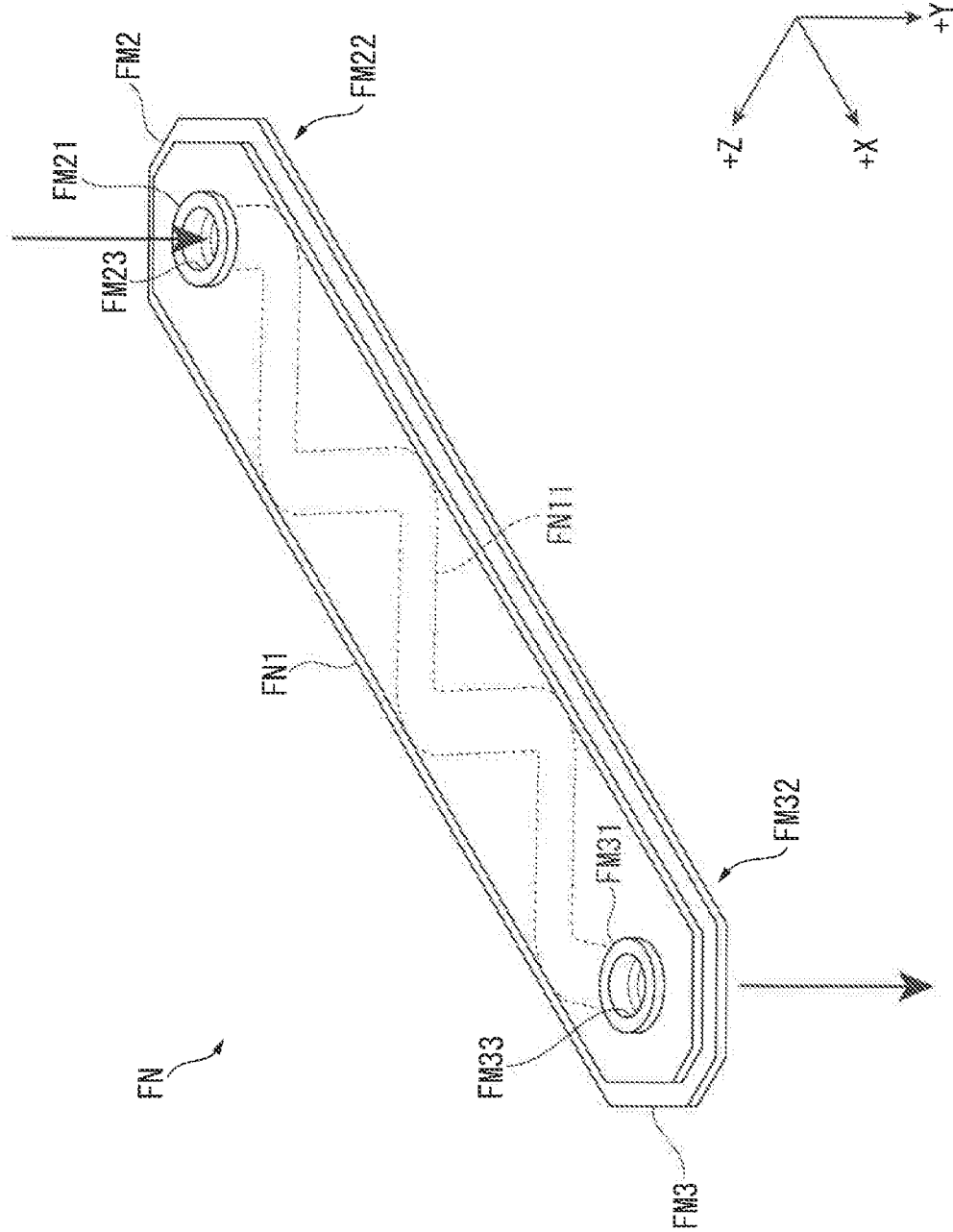
FIG. 8 is a schematic perspective view showing a variation of the channel forming member.

FIG. 8 is a perspective view showing another channel forming member FN.

For example, a channel forming member FN shown in FIG. 8 may be used to form any of the heat exchanging apparatus.

The channel forming member FN has the same configuration and function as those of the channel forming member FM shown in each of the embodiments described above except that the channel forming section FM1 is replaced with a channel forming section FN1. That is, the channel forming member FN includes the channel forming section FN1 and the connection sections FM2 and FM3.

Out of the components described above, a channel FN11, which allows a liquid refrigerant to flow therethrough, is formed in the channel forming section FN1, as in the case of the channel forming section FM1 shown in each of the embodiments described above, and the channel FN11 is so formed as to be serpentine (bend or curve) over the portion from the connection section FM2 to the connection section FM3. That is, the channel FN11 extends obliquely toward one side in the ±Z directions with respect to the direction that connects the connection section FM2 to the connection section FM3 (±X direction), then extends obliquely toward the other side, and extends obliquely toward the one side again. The channel FN11 is so formed as to repeatedly extend obliquely as described above to connect the connection sections FM2 and FM3 to each other in such a way that the liquid refrigerant can flow through the channel FN11.

The obliquely extending channel FN11 may be a linear or curved channel.

A heat exchanging apparatus formed of the combination of the channel forming member FN in plurality can provide the same effects as those provided by the heat exchanging apparatus 6, 6A, and 7 shown in the embodiments described above.

All the channels 63 and 75 to 77 may not be formed of the channel forming section FN1, and at least any of the channels 63 and 75 to 77 may be a serpentine channel, such as the channel FN11.

In the first and second embodiment described above, as the buffer section that reduces the flow rate of the liquid refrigerant in the inflow channel, the buffer sections 612, which are each a diameter reducer that protrudes from the inner wall of the inflow channel 61 inward in the radial direction, and the buffer section 613, which is a shaft having a roughly conical shape and disposed in the inflow channel 61A, are presented by way of example, but not necessarily, and the buffer section may have another configuration. For example, the inflow channel itself may be so configured that the inner diameter thereof decreases in the flow direction of the liquid refrigerant flowing through the inflow channel so that the cross-sectional area that allows the liquid refrigerant to flow therethrough decreases. Still instead, any of the buffer sections 612 and 613 may be employed in the inflow channel 71 in the third embodiment described above.

In the case where a buffer section formed of a shaft is provided in the inflow channel, the shaft may instead be so shaped that the outer diameter thereof increases stepwise (stepped shape in side view) in the in-flow-channel flow direction. In this case, the first and second portions described above can be clearly configured.

In the first embodiment described above, the buffet sections 612 are each a diameter reducer that protrudes from the inner wall of the inflow channel 61 inward in the radial direction. The thus shaped buffer sections 612 may not protrude from the inner wall of the inflow channel 61 over the entire circumference in the circumferential direction. For example, the buffer sections 612 may be disposed at equal intervals in the circumferential direction of the inflow channel 61.

The buffer sections 612 may still instead be so formed that the cross-sectional area that allows the third refrigerant RE3 to flow therethrough decreases in the flow direction of the third refrigerant RE3. In this case, the dimension representing how much the buffer sections 612 protrude from the inner wall of the inflow channel 61 inward in the radial direction may increase in the flow direction. In a case where a plurality of buffer sections 612 are provided, the upstream (−Y-direction-side) buffer section 612 may protrude by a smaller amount, and the downstream (+Y-direction-side) buffer section 612 may protrude by a larger amount.

The number of provided buffer sections 612 is two in the above description, but not necessarily, and the inflow channel 61 may be provided with one or three or more buffer sections.

In the second embodiment described above, the buffer section 613 is formed in a roughly conical shape having an outer diameter that increases in the flow direction of the liquid refrigerant flowing through the inflow channel 61A, but not necessarily, and the buffer section 613 may have a roughly columnar shape or a roughly trapezoidal shape.

In the third embodiment described above, the heat exchanging apparatus 7 includes one inflow channel 71, one first primary channel 72, one second primary channel 73, and one outflow channel 74, a plurality of first channels 75, which connect the inflow channel 71 to the first primary channel 72, a plurality of second channels 76, which connect the first primary channel 72 to the second primary channel 73, and plurality of third channels 77, which connect the second primary channel 73 to the outflow channel 74, but not necessarily. The channels of a heat exchanging apparatus through which a liquid refrigerant flows may be so configured that the number of primary channels provided between the inflow channel and the outflow channel may be one or three or more. In this case, channels that connect the inflow channel to a primary channel, channels that connect primary channels, and channels that connect a primary channel to the outflow channel may be provided in accordance with the number of primary channels.

In the third embodiment described above, the inflow channel 71 and the second primary channel 73 are so integrated with each other that the center axes thereof are coaxial with each ether, and the first primary channel 72 and the outflow channel 74 are so integrated with each other that the center axes thereof are coaxial with each other, but not necessarily. The inflow channel 71 and the second primary channel 73 may be provided independently of each other, and the first primary channel 72 and the outflow channel 74 may be provided independently of each other. For example, the first primary channel 72 may be located on the +X-direction side of the inflow channel 71, the second primary channel 73 may be located on the +X-direction aide of the first primary channel 72, end the outflow channel 74 may be located on the +X-direction side of the second primary channel 73. That is, the liquid refrigerant flows through the first channels 75, the second channels 76, and the third cannels 77 all in the +X direction, and the liquid refrigerant may flow stepwise in the entire heat exchanging apparatus.

In the embodiments described above, the inflow channels 61, 61A, 71 and the outflow channels 62 and 74 are so disposed as to be parallel to each other, but not necessarily, and the inflow channel and the outflow channel may not be parallel to each other. The configuration in which the inflow channel and the outflow channel are not parallel to each other allows the direction in which a liquid refrigerant flows into the inflow channel to differ from the direction in which the liquid refrigerant flows out of the outflow channel.

In the first and second embodiments described above, the number of channels 63 arranged in the +Y direction is 15, as shown in FIGS. 4 and 6, and in the third embodiment described above, the numbers of first channels 75, second channels 76, and third channels 77 arranged in the +Y direction are each 5 as shown in FIG. 7, but not necessarily. The numbers of channels 63, first channels 75, second channels 76, and third channels 77 can be changed as appropriate. Further, the numbers of channels 75 to 77 do not need to be the same.

In each of the embodiments described above, the cooling apparatus 5 includes the tank 531, the pump 55, the third heat exchanger 532, the light source coolers 533, the cooling structure 534, the second heat exchanger 56, and the plurality of connection members CN, which connect the components described above to each other, but necessarily. At least one of the tank 531 and the second heat exchanger 56 may be omitted, and one of the third heat exchanger 532 and the light source coolers 56 may be omitted. Further, the third heat exchanger 532 provided as a heat exchanger in the third circulation channel 53 may not be disposed in the second sealed enclosure 541, which is roughly sealed, and may instead be a heat exchanger that cools another cooling target. Similarly, the light source coolers 533 each provided as a heat exchanger may each be a cooler that cools another cooling target. Further, the cooling apparatus 5 may not include the first circulation channel 51, the second circulation channel 52, or the fourth circulation channel 54.

In the embodiments described above, the heat exchanging apparatus 6, 6A, and 7 are so disposed that the third refrigerant RE3 flows thereinto in the +Y direction, but necessarily, and the heat exchanging apparatus 6, 6A, and 7 may be so disposed that the third refrigerant RE3 flows thereinto in another direction. For example, the heat exchanging apparatus 6, 6A, and 7 may be so disposed that the liquid refrigerant flows thereinto in the −Y direction.

In the embodiments described above, in the third circulation channel 53, the heat exchanging apparatus 6, 6A, and 7 are each provided on the connection member CN that connects the light source coolers 533 to the second heat exchanger 56 and the number of provided heat exchanging apparatus is one, as shown in FIG. 3 but necessarily. In the third circulation channel 53, any of the heat exchanging apparatus 6, 6A, and 7 may instead be provided at the location where another connection member CN is disposed, for example, on the connection member CN that connects the third heat exchanger 532 to the light source coolers 533. Further, in the third circulation channel 53, any of the heat exchanging apparatus 6, 6A, and 7 may be provided in plurality at the location where one of the connection members CN is disposed. Moreover, any of the heat exchanging, apparatus 6, 6A, and 7 may be provided, in addition to the third circulation channel 53, on another circulation channel, for example, at the location where one of the connection members CM is provided in the second circulation channel. The configurations described above may be combined with each other as appropriate, and at least two of the heat exchanging apparatus 6, 6A, and 7 may be employed in the cooling apparatus 5.

In each of the embodiments described above, the projector 1 includes the three light modulators 342 (342R, 342G, and 342B), but necessarily. That is, the invention is also applicable to a projector using two or fewer light modulators or four or greater light modulators.

In each of the embodiments described above, the light modulators 342 each include a transmissive liquid crystal panel CP having a light incident surface and a light exiting surface separate from each other and may instead include a reflective liquid crystal panel having a same surface that serves as both the light incident surface and the light exiting surface. Further, a light modulator using any component other than a liquid-crystal-based component and capable of modulating an incident light flux to form an image according to image information, such as a device using micromirrors, for example, a DMD (digital micromirror device), may be employed. In this case, the light-incident-side polarizer IP and the light-exiting-side polarizer EP can be omitted.

In each of the embodiments described above, the case where the cooling apparatus 5 including the corresponding one of the heat exchanging apparatus 6, 6A, and 7 is used in a projector is presented by way of example, but not necessarily. The heat exchanging apparatus according to any of the embodiments of the invention may be used in a cooling apparatus that cools another cooling target. A cooling apparatus including the heat exchanging apparatus according to any of the embodiments of the invention may be used in another electronic apparatus, an automobile, or any other apparatus.

The entire disclosure of Japanese Patent Application No. 2017-175130, filed Sep. 12, 2017 is expressly incorporated by reference herein.

What is claimed is:

1. A heat exchanging apparatus comprising:
an inflow channel including an inflow port configured to receive a liquid refrigerant flowing in a first direction;
an outflow channel including an outflow port, the outflow channel being configured to receive the liquid refrigerant after the liquid refrigerant has flowed through the inflow channel, and the outflow port being configured to expel the liquid refrigerant from the heat exchanging apparatus;
a plurality of channels extending from the inflow channel to the outflow channel in a second direction intersecting the first direction, the inflow channel being disposed on an opposite side of the plurality of channels from the outflow channel, the plurality of channels being arranged along the first direction and connecting the inflow channel to the outflow channel, the plurality of channels being configured to allow the liquid refrigerant to flow from the inflow channel to the outflow channel, the plurality of channels being connected to the inflow channel over a portion of the inflow channel from the inflow port to a terminal end; and at least one buffer section disposed in the inflow channel and between the inflow port and the terminal end, the at least one buffer section being configured to reduce a flow rate of the liquid refrigerant flowing through the inflow channel.

2. The heat exchanging apparatus according to claim 1, wherein, along a third direction perpendicular to the first direction, a cross-sectional area of the inflow channel where the at least one buffer section is located is less than a cross-sectional area of the inflow channel where the at least one buffer section is not located.

3. The heat exchanging apparatus according to claim 2, wherein the at least one buffer section includes at least one diameter reducer protruding radially inward from an inner wall of the inflow channel and reducing a diameter of the inflow channel.

4. The heat exchanging apparatus according to claim 3, wherein the inflow channel includes a plurality of buffer sections including the at least one buffer section along the first direction.

5. The heat exchanging apparatus according to claim 2, wherein the at least one buffer section is a shaft provided in the inflow channel and extending in the first direction, the shaft including:
a first portion having an outer diameter with a first length, and
a second portion located on a downstream side of the first portion in the first direction, the second portion having an outer diameter with a second length greater than the first length.

6. The heat exchanging apparatus according to claim 5, wherein the outer diameter of the shaft increases in the first direction from the first portion to the second portion.

7. The heat exchanging apparatus according to claim 1, wherein the inflow channel and the outflow channel are parallel.

8. A cooling apparatus comprising:
the heat exchanging apparatus according to claim 1;
a tank configured to store the liquid refrigerant;
a heat exchanger configured to transfer heat of a cooling target to the liquid refrigerant to cool the cooling target; and
a pump configured to transfer the liquid refrigerant from the cooling target to the heat exchanging apparatus.

9. A projector comprising:
a light source apparatus configured to emit light;
a light modulator configured to modulate the light emitted from the light source apparatus in accordance with image information;
a projection optical apparatus configured to project the light modulated by the light modulator; and
the cooling apparatus according to claim 8.

10. The projector according to claim 9, wherein the cooling target is the light modulator.

11. The projector according to claim 9, further comprising a polarization conversion element configured to align polarization directions of light incident to the polarization conversion element with one another, wherein the cooling target is the polarization conversion element.

12. The projector according to claim 9, further comprising a wavelength converter configured to convert a wavelength of light incident to the wavelength converter, wherein the cooling target is the wavelength converter.

13. The projector according to claim 9, further comprising a light diffuser configured to diffuse light incident to the light diffuser, wherein the cooling target is the light diffuser.

14. The heat exchanging apparatus according to claim 1, wherein the buffer section includes a wall extending circumferentially around the inflow channel and extending radially inward from an inner surface of the inflow channel.

15. A heat exchanging apparatus comprising:
an inflow channel including an inflow port configured to receive a liquid refrigerant flowing in a first direction;
a first primary channel disposed along the first direction, the first primary channel being configured to receive the liquid refrigerant after the liquid refrigerant has flowed through the inflow channel;
a second primary channel disposed along the first direction, the second primary channel being configured to receive the liquid refrigerant after the liquid refrigerant has flowed through the first primary channel;
an outflow channel being configured to receive the liquid refrigerant after the liquid refrigerant has flowed through the second primary channel, the outflow channel including an outflow port configured to expel the liquid refrigerant from the heat exchanging apparatus;
a plurality of first channels extending in a second direction intersecting the first direction, the plurality of the first channels being arranged in the first direction and connecting the inflow channel to the first primary channel, the plurality of the first channels being configured to direct flow of the liquid refrigerant from the inflow channel to the first primary channel;
a plurality of second channels extending in the second direction, the plurality of the second channels being arranged in the first direction and connecting the first primary channel to the second primary channel, the plurality of the second channels being configured to direct flow of the liquid refrigerant from the first primary channel to the second primary channel; and
a plurality of third channels extending in the second direction, the plurality of the third channels being arranged in the first direction and connecting the second primary channel to the outflow channel, the plurality of the third channels being configured to direct flow of the liquid refrigerant from the second primary channel to the outflow channel.

16. The heat exchanging apparatus according to claim 15, wherein:
the inflow channel and the second primary channel are integrated,
a center axis of the inflow channel and a center axis of the second primary channel are parallel,
the outflow channel and the first primary channel are integrated, and
a center axis of the outflow channel and a center axis of the first primary channel are parallel.

17. The heat exchanging apparatus according to claim 15, wherein the inflow channel and the outflow channel are parallel.

18. A cooling apparatus comprising:
the heat exchanging apparatus according to claim 15;
a tank configured to store the liquid refrigerant;
a heat exchanger configured to transfer heat of a cooling target to the liquid refrigerant to cool the cooling target; and a pump configured to transfer the liquid refrigerant from the cooling target to the heat exchanging apparatus.

19. A projector comprising:
a light source apparatus configured to emit light;
a light modulator configured to modulate the light emitted from the light source apparatus in accordance with image information;
a projection optical apparatus configured to project the light modulated by the light modulator; and
the cooling apparatus according to claim 18.

20. The projector according to claim 19, wherein the cooling target is the light modulator.

21. The projector according to claim 19, further comprising a wavelength converter configured to convert a wavelength of light incident to the wavelength converter, wherein the cooling target is the wavelength converter.

* * * * *